(12) United States Patent
McAllister

(10) Patent No.: US 9,747,480 B2
(45) Date of Patent: Aug. 29, 2017

(54) RFID AND ROBOTS FOR MULTICHANNEL SHOPPING

(71) Applicant: Clarke William McAllister, Eugene, OR (US)

(72) Inventor: Clarke William McAllister, Eugene, OR (US)

(73) Assignee: ADASA Inc., Eugene, OR (US)

( * ) Notice: Subject to any disclaimer, the term of this patent is extended or adjusted under 35 U.S.C. 154(b) by 943 days.

(21) Appl. No.: 13/693,026

(22) Filed: Dec. 3, 2012

(65) Prior Publication Data

US 2014/0152507 A1  Jun. 5, 2014

Related U.S. Application Data

(60) Provisional application No. 61/567,117, filed on Dec. 5, 2011, provisional application No. 61/677,470, filed on Jul. 30, 2012, provisional application No. 61/708,207, filed on Oct. 1, 2012, provisional application No. 61/709,771, filed on Oct. 4, 2012.

(51) Int. Cl.
| | |
|---|---|
| *G06K 7/10* | (2006.01) |
| *H01Q 1/22* | (2006.01) |
| *H01Q 1/36* | (2006.01) |
| *H01Q 11/08* | (2006.01) |
| *G01S 13/75* | (2006.01) |
| *G06K 17/00* | (2006.01) |
| *G01S 13/87* | (2006.01) |

(52) U.S. Cl.
CPC ........ *G06K 7/10376* (2013.01); *G01S 13/751* (2013.01); *H01Q 1/2216* (2013.01); *H01Q 1/362* (2013.01); *H01Q 11/08* (2013.01); *G01S 13/878* (2013.01); *G06K 2017/0051* (2013.01)

(58) Field of Classification Search
CPC ........ G01S 5/02; G01S 5/0221; G01S 5/0242; G01S 5/0289; G06Q 10/087; G06K 7/10366; G06K 7/10376; G06K 7/10316; Y10S 901/01; Y10S 901/46; Y10S 901/47
USPC .......................................................... 342/464
See application file for complete search history.

(56) References Cited

U.S. PATENT DOCUMENTS

| | | | |
|---|---|---|---|
| 300,827 | A | 6/1884 | Adams |
| 552,271 | A | 12/1895 | Bolton |
| 572,036 | A | 11/1896 | Theryc |
| 2,190,717 | A | 2/1940 | Kukop |
| 2,573,401 | A | 10/1951 | Carter |

(Continued)

FOREIGN PATENT DOCUMENTS

| | | |
|---|---|---|
| EP | 1913235 | 7/2006 |
| EP | 1770591 A2 | 4/2007 |

(Continued)

OTHER PUBLICATIONS

Claire Swedberg, Robotic RFID Reader Automates Inventory Tracking, RFID Journal, Nov. 28, 2012.

*Primary Examiner* — Christopher Harmon

(57) ABSTRACT

The present invention relates to systems, methods, and devices for consumers using RFID-tagged items for multichannel shopping using smartphones, tablets, and indoor navigation, preservation of consumer's privacy related to RFID-tagged items that they leave a retail store with, and automatically reading and locating retail inventory without directly using store labor. Robots and aerial mobile automated RFID reading devices are disclosed.

8 Claims, 19 Drawing Sheets

(56) References Cited

U.S. PATENT DOCUMENTS

| | | |
|---|---|---|
| 3,101,472 A | 8/1963 | Goubau |
| 3,500,427 A | 3/1970 | Landesman |
| 3,755,815 A | 8/1973 | Stangel |
| 3,766,558 A | 10/1973 | Kuechken |
| 3,864,689 A | 2/1975 | Young |
| 4,023,167 A | 5/1977 | Wahlstrom |
| 4,129,866 A | 12/1978 | Turco |
| 4,163,233 A | 7/1979 | Becker |
| 4,203,105 A | 5/1980 | Dragone |
| 4,223,830 A | 9/1980 | Walton |
| 4,250,508 A | 2/1981 | Dragone |
| 4,278,977 A | 7/1981 | Nossen |
| 4,471,345 A | 9/1984 | Barrett |
| 4,476,469 A | 10/1984 | Lander |
| 4,598,275 A | 7/1986 | Ross |
| 4,636,950 A | 1/1987 | Caswell |
| 4,673,932 A | 6/1987 | Ekchian |
| 4,779,097 A | 10/1988 | Morchin |
| 4,809,178 A | 2/1989 | Ninomiya |
| 4,918,425 A | 4/1990 | Greenberg |
| 5,019,815 A | 5/1991 | Lemelson |
| 5,036,308 A | 7/1991 | Fockens |
| 5,155,684 A | 10/1992 | Burke |
| 5,165,064 A | 11/1992 | Mattaboni |
| 5,214,410 A | 5/1993 | Verster |
| 5,266,925 A | 11/1993 | Vercellotti |
| 5,280,159 A | 1/1994 | Schultz |
| 5,381,137 A | 1/1995 | Ghaem |
| 5,382,784 A | 1/1995 | Eberhardt |
| 5,500,650 A | 3/1996 | Snodgrass |
| 5,530,330 A | 6/1996 | Baiden |
| 5,583,850 A | 12/1996 | Snodgrass |
| 5,621,199 A | 4/1997 | Calari |
| 5,627,544 A | 5/1997 | Snodgrass |
| 5,689,238 A | 11/1997 | Cannon |
| 5,708,423 A | 1/1998 | Ghaffafi |
| 5,763,867 A | 6/1998 | Main |
| 5,785,181 A | 7/1998 | Quartararo |
| 5,798,693 A | 8/1998 | Engellenner |
| 5,825,045 A | 10/1998 | Koenck |
| 5,825,298 A | 10/1998 | Walter |
| 5,850,187 A | 12/1998 | Carrender |
| 5,962,837 A | 10/1999 | Main |
| 5,974,078 A | 10/1999 | Tuttle |
| 5,986,570 A | 11/1999 | Black |
| 5,995,017 A | 11/1999 | Marsh |
| 6,002,344 A | 12/1999 | Bandy |
| 6,076,025 A | 6/2000 | Ueno |
| 6,078,251 A | 6/2000 | Landt |
| 6,122,329 A | 9/2000 | Zai |
| 6,130,613 A | 10/2000 | Eberhardt |
| 6,184,841 B1 | 2/2001 | Shober |
| 6,195,006 B1 | 2/2001 | Bowers |
| 6,195,053 B1 | 2/2001 | Kodukula |
| 6,354,493 B1 | 3/2002 | Mon |
| 6,397,063 B1 | 5/2002 | Sessions |
| 6,414,626 B1 | 7/2002 | Greef |
| 6,415,978 B1 | 7/2002 | McAllister |
| 6,459,726 B1 | 10/2002 | Ovard |
| 6,486,780 B1 | 11/2002 | Garber |
| 6,677,852 B1 | 1/2004 | Landt |
| 6,724,308 B2 | 4/2004 | Nicholson |
| 6,809,490 B2 | 10/2004 | Jones |
| 6,830,181 B1 | 12/2004 | Bennett |
| 7,023,341 B2 | 4/2006 | Stilp |
| 7,057,492 B2 | 6/2006 | Jackson |
| 7,075,435 B2 | 7/2006 | Jesser |
| 7,118,036 B1 | 10/2006 | Couch |
| 7,119,738 B2 | 10/2006 | Bridgelall |
| 7,223,030 B2 | 5/2007 | Fessler |
| 7,236,091 B2 | 6/2007 | Kiang |
| 7,245,215 B2 | 7/2007 | Gollu |
| 7,250,845 B2 | 7/2007 | Mick |
| 7,265,674 B2 | 9/2007 | Tuttle |
| 7,319,397 B2 | 1/2008 | Chung |
| 7,321,305 B2 | 1/2008 | Gollu |
| 7,400,989 B2 | 7/2008 | Chapman |
| 7,446,662 B1 | 11/2008 | Somogyi |
| 7,455,217 B2 | 11/2008 | Taylor |
| 7,538,946 B2 | 5/2009 | Smith |
| 7,548,166 B2 | 6/2009 | Roeder |
| 7,603,291 B2 * | 10/2009 | Raiyani et al. ............... 705/26.7 |
| 7,669,763 B2 | 3/2010 | Ernesti |
| 7,693,757 B2 | 4/2010 | Zimmerman |
| 7,733,230 B2 | 6/2010 | Bomber |
| 7,747,477 B1 * | 6/2010 | Louie et al. .................... 705/28 |
| RE41,531 E | 8/2010 | Wood |
| RE41,562 E | 8/2010 | Dando |
| 7,821,391 B2 | 10/2010 | Gupta |
| 7,822,424 B2 | 10/2010 | Markhovsky |
| 7,830,262 B1 | 11/2010 | Diorio |
| 7,876,224 B2 | 1/2011 | Prokopuk |
| 7,877,166 B2 | 1/2011 | Harwig |
| 7,916,028 B2 | 3/2011 | Oberle |
| 7,932,827 B2 | 4/2011 | Chand |
| 8,031,070 B2 | 10/2011 | Fabre |
| 8,072,311 B2 | 12/2011 | Sadr |
| 8,077,041 B2 | 12/2011 | Stern |
| 8,083,013 B2 * | 12/2011 | Bewley et al. ................ 180/8.3 |
| 8,085,150 B2 | 12/2011 | Oberle |
| 8,174,369 B2 | 5/2012 | Jones |
| 8,237,563 B2 | 8/2012 | Schatz |
| 8,289,129 B2 | 10/2012 | Bauchot |
| 8,294,554 B2 | 10/2012 | Shoarinejad |
| 8,412,450 B1 | 4/2013 | Huebner |
| 8,423,548 B1 | 4/2013 | Trandal |
| 8,532,846 B2 | 9/2013 | Tollenaere |
| 8,556,173 B1 | 10/2013 | Huebner |
| 8,618,928 B2 | 12/2013 | Weed |
| 8,754,752 B2 | 6/2014 | Shoarinejad |
| 9,020,639 B2 * | 4/2015 | Bewley et al. ................ 700/258 |
| 9,061,102 B2 | 6/2015 | Levien |
| 2002/0005774 A1 | 1/2002 | Rudolph |
| 2002/0070862 A1 | 6/2002 | Francis |
| 2004/0074964 A1 | 4/2004 | Falkenrich-Wesche |
| 2005/0128124 A1 * | 6/2005 | Greneker, III ....... A61B 5/0507 342/22 |
| 2005/0149226 A1 * | 7/2005 | Stevens et al. ............... 700/214 |
| 2005/0200457 A1 | 9/2005 | Bridgelall |
| 2005/0246248 A1 | 11/2005 | Vesuna |
| 2006/0068711 A1 | 3/2006 | Chiu |
| 2006/0114104 A1 | 6/2006 | Scaramozzino |
| 2007/0061041 A1 | 3/2007 | Zweig |
| 2007/0073513 A1 | 3/2007 | Posamentier |
| 2007/0095341 A1 * | 5/2007 | Kaneff ..................... F16B 2/12 126/601 |
| 2007/0131754 A1 | 6/2007 | Brandon |
| 2007/0176780 A1 | 8/2007 | Hart |
| 2007/0222665 A1 | 9/2007 | Koeneman |
| 2007/0252696 A1 | 11/2007 | Belisle |
| 2007/0282482 A1 | 12/2007 | Beucher |
| 2008/0042847 A1 * | 2/2008 | Hollister et al. ........... 340/572.7 |
| 2008/0042896 A1 * | 2/2008 | Alon .................... G01S 7/4026 342/174 |
| 2008/0068173 A1 | 3/2008 | Alexis |
| 2008/0077511 A1 * | 3/2008 | Zimmerman .................. 705/28 |
| 2008/0106377 A1 | 5/2008 | Flores |
| 2008/0157967 A1 | 7/2008 | Jones |
| 2008/0191873 A1 | 8/2008 | Minerley |
| 2008/0191881 A1 | 8/2008 | Minerley |
| 2008/0224871 A1 * | 9/2008 | Bolotin et al. ............. 340/572.1 |
| 2008/0231457 A1 * | 9/2008 | Mattice et al. ............ 340/572.7 |
| 2008/0266092 A1 | 10/2008 | Campero |
| 2009/0012667 A1 * | 1/2009 | Matsumoto et al. .......... 701/26 |
| 2009/0016308 A1 | 1/2009 | Twitchell |
| 2009/0021351 A1 | 1/2009 | Beniyama |
| 2009/0146792 A1 | 6/2009 | Sadr |
| 2009/0160638 A1 * | 6/2009 | Jesme .................... G01S 13/825 340/539.11 |
| 2009/0231138 A1 | 9/2009 | Lai |
| 2009/0243924 A1 | 10/2009 | Twitchell |
| 2010/0049368 A1 | 2/2010 | Chen |
| 2010/0100269 A1 | 4/2010 | Ekhaguere |
| 2010/0109844 A1 | 5/2010 | Carrick |

(56) References Cited

U.S. PATENT DOCUMENTS

| | | |
|---|---|---|
| 2010/0309017 A1* | 12/2010 | Ramchandran et al. ............... 340/825.49 |
| 2010/0310019 A1 | 12/2010 | Sadr |
| 2011/0090059 A1 | 4/2011 | Sadr |
| 2011/0254664 A1 | 10/2011 | Sadr |
| 2011/0315765 A1* | 12/2011 | Schantz et al. ............... 235/385 |
| 2012/0112904 A1 | 5/2012 | Nagy |
| 2012/0136630 A1 | 5/2012 | Murphy |
| 2012/0139704 A1 | 6/2012 | Sadr |
| 2012/0188058 A1 | 7/2012 | Lee |
| 2012/0197439 A1 | 8/2012 | Wang |
| 2012/0212331 A1 | 8/2012 | Jones |
| 2012/0271461 A1 | 10/2012 | Spata |
| 2012/0274525 A1 | 11/2012 | Lam |
| 2012/0275546 A1 | 11/2012 | Divsalar |
| 2012/0293373 A1 | 11/2012 | You |
| 2013/0024219 A1 | 1/2013 | Martinez |
| 2013/0218721 A1* | 8/2013 | Borhan et al. ............... 705/26.41 |
| 2013/0233964 A1 | 9/2013 | Woodworth |
| 2014/0032034 A1 | 1/2014 | Raptopoulos |
| 2014/0061377 A1 | 3/2014 | Smith |
| 2014/0197280 A1 | 7/2014 | Smith |
| 2014/0247116 A1* | 9/2014 | Davidson ............... 340/10.1 |
| 2014/0304107 A1* | 10/2014 | McAllister ............... 705/26.7 |
| 2014/0361077 A1* | 12/2014 | Davidson ............... 235/385 |

FOREIGN PATENT DOCUMENTS

| | | |
|---|---|---|
| EP | 1941411 A2 | 7/2008 |
| EP | 2017768 A1 | 1/2009 |
| EP | 2205333 | 7/2010 |
| EP | 2484892 A2 | 8/2012 |
| WO | WO2005076929 | 8/2005 |
| WO | WO2006039119 | 4/2006 |
| WO | WO2006076283 | 7/2006 |
| WO | WO2007047510 | 4/2007 |
| WO | WO2007094868 | 8/2007 |
| WO | WO2008097509 | 8/2008 |
| WO | WO2008118875 | 10/2008 |
| WO | WO2009157653 A3 | 12/2009 |
| WO | WO2011088182 | 7/2011 |
| WO | WO2011135328 | 11/2011 |
| WO | WO2011135329 | 11/2011 |
| WO | 2484892 A2 | 8/2012 |
| WO | WO2013071150 | 5/2013 |

\* cited by examiner

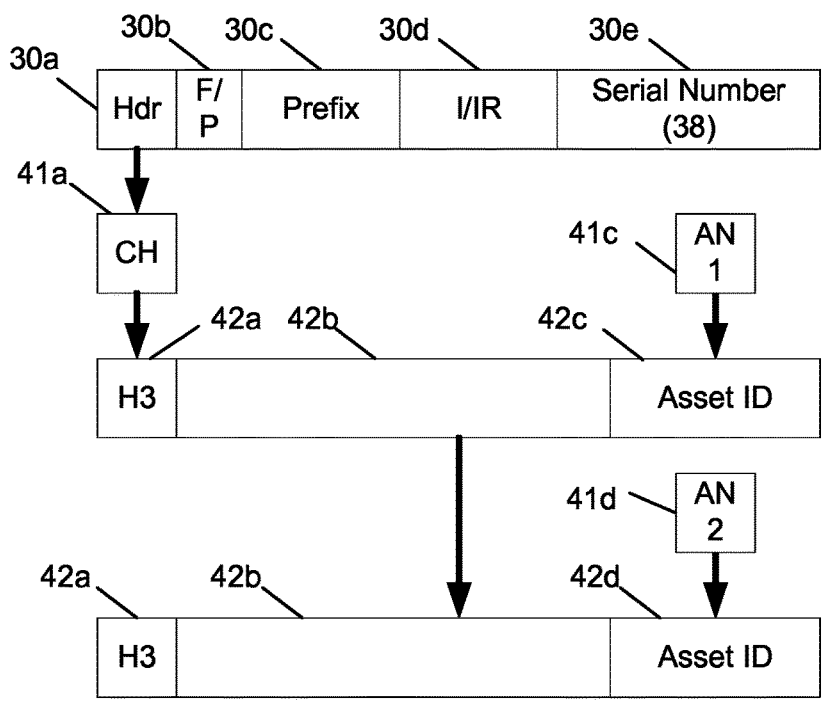
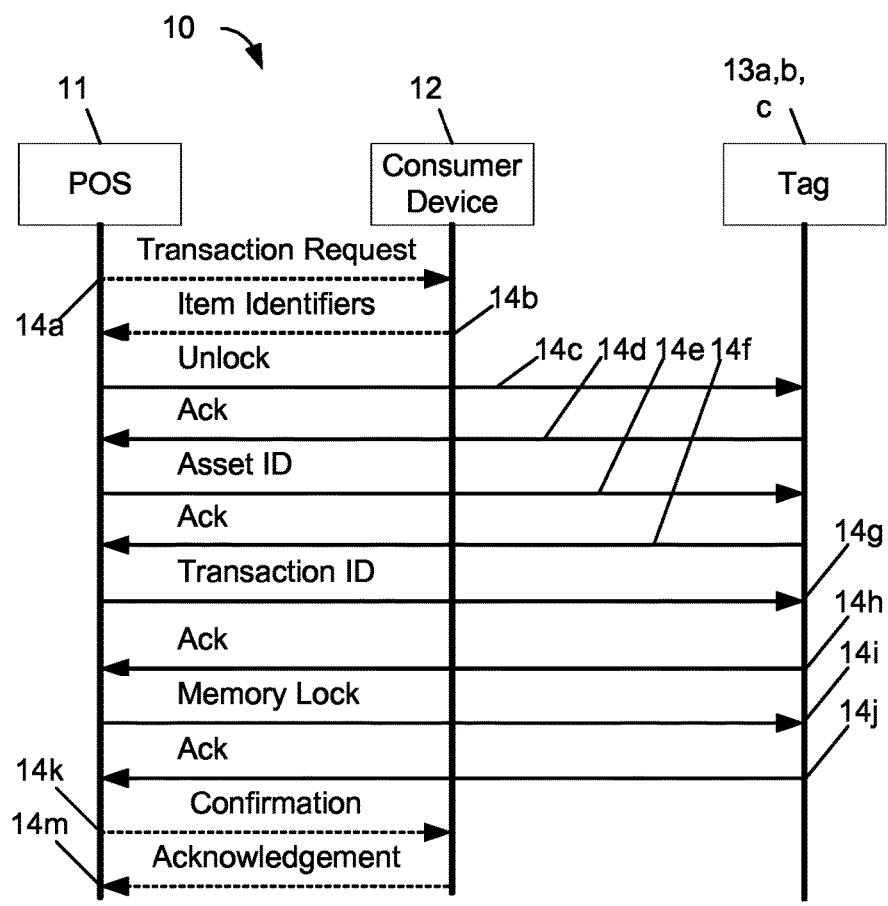
Fig. 4
Fig. 5

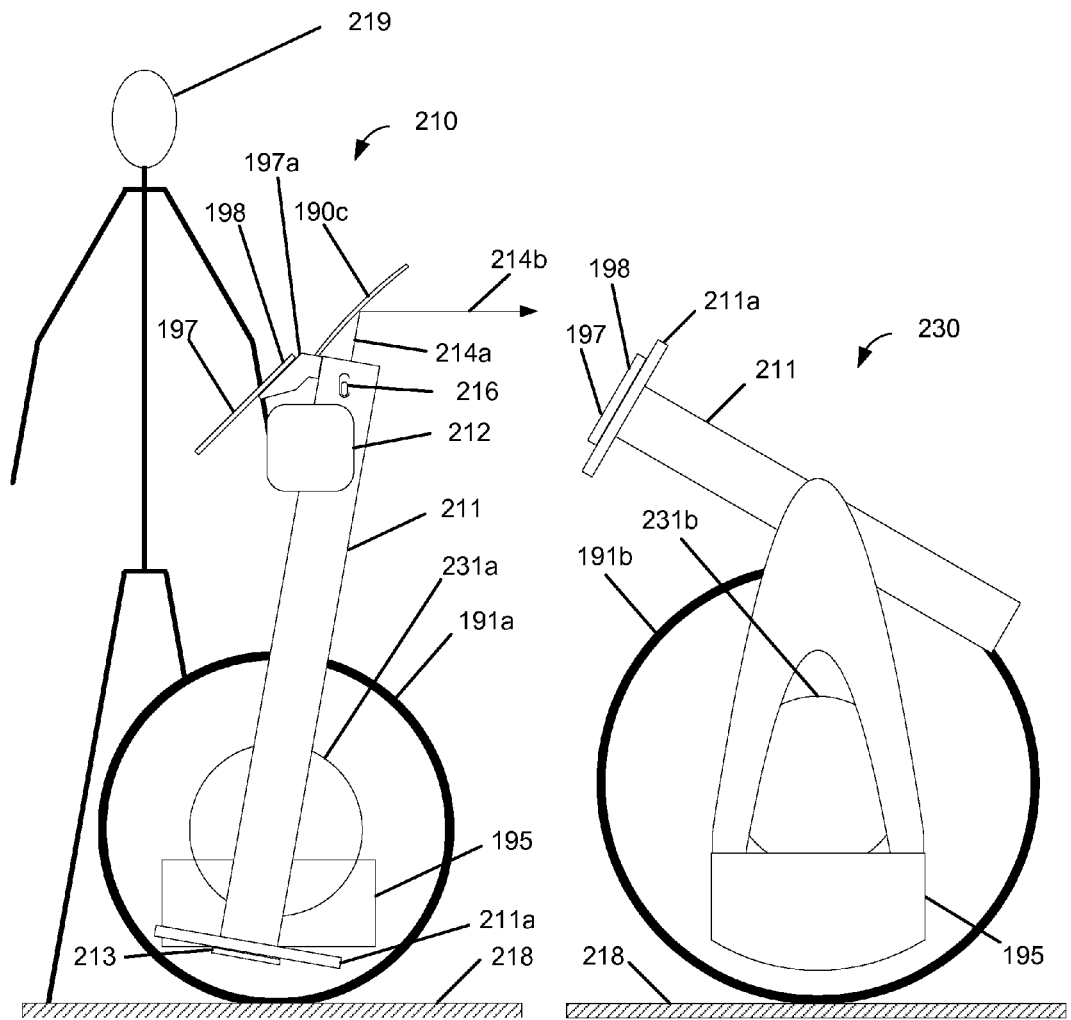
Fig. 21
Fig. 23
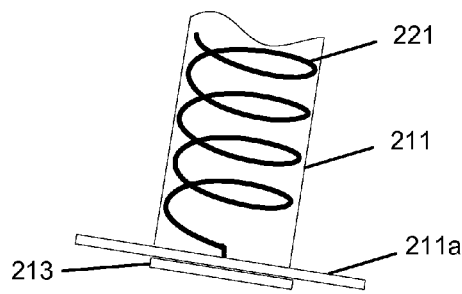
Fig. 22

RFID AND ROBOTS FOR MULTICHANNEL SHOPPING

RELATED APPLICATIONS

The present application is a continuation-in-part application which claims benefit based on U.S. patent application Ser. No. 13/526,520 filed on 19 Jun. 2012, which claims benefit of U.S. patent application Ser. No. 12/820,109 (U.S. Pat. No. 8,228,198) filed on 21 Jun. 2010, which claims benefit of U.S. patent application Ser. No. 11/465,712 (U.S. Pat. No. 7,830,258) filed on 18 Aug. 2006, and U.S. Patent Application No. 60/709,713 filed on 19 Aug. 2005, and a continuation-in-part of U.S. patent application Ser. No. 12/124,768 (abandoned) filed on 21 May 2008, which claims benefit of U.S. Provisional Patent App. No. 60/939,603 filed on 22 May 2007, all by the same inventor Clarke W. McAllister. The present application also claims the benefit under 35 USC Section 119(e) of U.S. Provisional Application Nos. 61/567,117 filed 5 Dec. 2011, and 61/677,470 filed 30 Jul. 2012, and 61/708,207 filed 1 Oct. 2012, and of 61/709,771 filed 4 Oct. 2012, all by the same inventor Clarke W. McAllister, the disclosures of which are expressly incorporated herein by reference.

BACKGROUND

There are countless examples of RFID technology being used in retail stores for inventory and supply chain applications. Studies have shown that 10 percent or more sales uplift can be realized by reducing the out-of-stock SKU's in retail stores. However the use of RFID by consumers using their RFID-tagged merchandise at home has not been adequately addressed by prior art. One of the impediments to such progress is the lack of automated inventory measurement systems. Such systems are therefore a preliminary step toward consumer-facing smart phone applications of the present invention and are described in detail below.

Forrester and zmags report now that mobile devices are driving online sales; $137 million in sales from smartphones and $61 million from tablets in 2012. Sales are rising to 9% by 2017 at 26% to 35% CAGR. Retail items include: daily deals, toys, media, consumer electronics, clothing, shoes, accessories and house wares. IBM reports that in 2012 12.9% of online sales were from mobile, split about evenly between smartphones and tablets. 32% to 54% plan to shop in 2012-2013 holiday season using smartphones or tablets, more prevalently among men. Tablets are most commonly used for browsing and researching products and making purchases. The use of QR codes is relatively small. Search engines and email is used more prevalently by consumers to access retailers' web pages; the use of SMS is not a top-3 driver. The repeat customer rate is 29%. Average order value is almost $160. Shopping frequency is several times a month, with 18% of tablet users more than once a week. HTML5 is preferred over Flash.

Many shoppers research online and then come to the retail stores with their smart phones, armed with prices, facts, and analysis. The mobile phone guides them to and through the stores helping them make their purchase decisions. RFID will play an increasing role in this process. Indoor navigation will guide the mission shopper through the targeted stores in the most efficient way possible. It will become the retailer's challenge to entice the mission shopper to buy more while in the store, either as planned or unplanned purchases.

Consumers will also interact with RFID tags at home. Consumers have a different set of needs for RFID tags than do the brand owners and retailers that sell them the goods. The present invention teaches how supply-chain RFID transponders are transformed into transponders that are safe for use at home.

The present invention relates to a system, including methods and devices utilizing wireless sensor devices and RFID (radio-frequency identification) transponders. Specifically, the present invention relates to systems, methods, and devices for increasing privacy preservation for supply chain transponders that are used by consumers after tagged items are purchased and brought home.

Radio-frequency identification (RFID) transponders enable improved identification and tracking of objects by encoding data electronically in a compact tag or label. Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification.

RFID transponders rank into two primary categories: active (or battery assist) RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to remote devices such as interrogators.

One problem of prior-art RFID transponders are permanently locked memory banks that prevent unique information from being erased. The EPC TID memory bank is permalocked by the RFID chip vendor. If the TID contains a unique serial number, as many do in TID bits $30h\text{-}5Fh$, then notwithstanding non-standard features on the chip to enhance privacy, the transponder can never be reprogrammed as a privacy preserving RFID transponder. Similarly, if the EPC SGTIN for example that is typically stored in bank 01 is permalocked, then it too, with its unique serial number would be an immutable threat to consumer privacy.

Generating a unique EPC serial number is imperative, and is required for EPCglobal RFID tagging implementations. Preferred serialization methods require a central issuing authority of numbers for manufacturers, products, and items to guarantee uniqueness and to avoid duplication of numbers. Blocks of numbers are distributed to remote locations globally. The uniqueness of an identifier is critical to the success of almost any tracking system. Assuring uniqueness is not necessarily simple.

Uniqueness of the numbers is the greatest threat to consumer privacy. A person can be uniquely identified and tracked through a crowd in public places for example by associating a unique number on a transponder with a particular person. The transponder may for example be attached to an article of clothing, a shoe, or handbag. The transponder may be there by choice of the consumer, but the value of the transponder being there should be restricted and controlled by the consumer.

So, despite recent advances in RFID technology, the state-of-the-art does not fully address the needs of simple, efficient, transformation of uniquely numbered RFID transponders and wireless sensors into privacy preserving transponders. Large-scale adoption of RFID transponders depends on systems create value for all parties in the supply chain, including and especially the consumer.

Inventor Christopher Dioria teaches in U.S. Pat. Nos. 7,872,582 and 8,044,774 special function P-R-Bits that are used to selectively kill portions of the RFID chip, preventing them from being read. In U.S. Pat. No. 7,057,492 features are activated at a POS.

In U.S. Pat. No. 7,742,348 Fred Schuessler teaches the use of coarse and fine pointers to selectively lock blocks of memory. In U.S. Patent Application 2008/00011724 inventors Soleimani and White teach secure access identification numbers and associated read lock pass codes. In U.S. Pat. No. 7,007,145 inventors Schrodinger and Blank teach password-protected memory areas on an integrated circuit. In U.S. Patent Application 2004/0246103 inventor Zukowski teaches a first and second access type with differing levels of memory access restrictions. In U.S. Patent Application 2005/0270141 inventor Dalglish teaches an RFID tag that is selectively cloaked by electronically disconnecting the output of the RFID chip from the antenna. In U.S. Pat. No. 7,298,243 inventor Juels teaches a system that uses classifications of identifiers to implement a privacy policy.

The documents EPC Radio-Frequency Identification Protocols Class-1 Generation-2 UHF RFID Protocol for Communications at 860-960 MHz Version 1.2.0 and EPC Tag Data Standard Version 1.5 describe tag recommissioning features that provide privacy for the brand owner and retailer, but fail to address the privacy needs of consumers. For example factory permalocked TID survives the EPC recommissioning process, posing a privacy risk to consumers. Additionally that recommissioning process specifically prevents subsequent recommissioning processes that could beneficially be used to return goods and restore the transponder's original functionality.

WO2011/009768 describes the use of recommissioning features of state-of-the art EPC transponders, but fails to describe the privacy preservation systems, methods, and devices of the present invention.

COMMISSION OF THE EUROPEAN COMMUNITIES COMMISSION RECOMMENDATION of Dec. 5, 2009 on the implementation of privacy and data protection principles in applications. In that document, paragraph 12 allows for tags that are used in a retail application and would remain operational after the point of sale that do not represent a likely threat to privacy or the protection of personal data. Retailers are advised to alter, deactivate, or remove any privacy-threatening RFID tags or data.

In US2010/0049368 inventor Chen teaches a robot that moves in response to operating instructions from an identified human voice.

In WO2005/076929 inventor Baker teaches a portal reader comprising a vertical column of RFID antennae. WO 2006/076283 describes an RFID cart which broadly includes a definition of cart that includes robots and a mobile component comprising at least two wheels. Inventors Melton et al fail to disclose how to prevent tipping and to maintain a two-wheeled robot in an upright and operational position. Unlike the present invention which discloses how a two-wheeled robot moves, remains in a controlled upright orientation, and performs its designated function, this prior art could not have enabled the present invention. The patent makes this broad reference to a cart: "or any other suitable vehicle or mobile mechanism of any appropriate size to accommodate at least one RFID antenna 125" but fails to teach the essential aspects of 'accommodating' the antenna to achieve the stated goal, fails to specify gain, or beam width, the need for either, and fails to specify the wavelength which greatly determines antenna size. This patent, the patent below, and all other prior art fail to address or solve for the blinding affects reflected carrier from reflective objects in the field of a high gain antenna.

Reflections from shelving and other metal objects in the field of an RFID reader are can blind and possibly saturate baseband amplifiers preventing tag reading. In U.S. Pat. No. 7,733,230 inventors Karen Bomber et al teach the use of a mobile platform with a repositionable antenna structure comprised of at least one readpoint antenna coupled to an antenna tower for reading tags. This patent fails to teach avoidance of retro-reflection problems, nor contemplates the need to narrow or sweep a beam to prevent data loss.

In U.S. Pat. No. 8,237,563 inventors Schatz, et al teach a fork lift reader that determines if a tag is within a small predefined zone or not. In US 2012/0112904 inventor Nagy teaches a tag location system using a plurality of receivers placed about a predefined area. In US2011/0169607 and WO2011/088182 inventor Paulson teaches a tag location system using separate exciters and wideband signals to multiple receiver antennae. In WO2011/135329 and WO2011/135329 and U.S. Pat. No. 8,077,041 the inventors teach a tag location system using a plurality of antenna coupled to an RF transmitter/receiver. In WO2008/118875, US2012/0139704, and EP2137710 inventors Sadr et al teach an RFID tag system comprising a plurality of exciters. In WO2007/094868 Sadr et al teach an RFID receiver that applies predetermined probabilities to a plurality of signal pairs to extract data. In US2010/0310019 inventor Sadr teaches estimation of received signals. In U.S. Pat. No. 8,174,369 inventors Jones and Sadr teach encoding and decoding tags using code word elements. In US2012/02755464 inventor Divsalar teaches a noncoherent soft output detector. In US2011/0254664 inventors Sadr and Jones teach a sensor cloud with a plurality of read zones. In US2012/0188058 Lee and Jones teach a joint beamformer and a plurality of antennae. In US2011/0090059 inventor Sadr teaches an antenna array used to determine RFID tag locations.

No prior art comprehensively teaches systems, methods or devices for moving among, avoiding carrier reflections, and automatically determining the presence and location of retail store inventory, nor for guiding interested consumers to those products as part of an engaging shopping experience, or of enhancing consumer privacy by transforming publicly readable SGTIN information to safe privacy encodings.

SUMMARY OF THE INVENTION

The present invention discloses: consumers using RFID-tagged items for multichannel shopping using smartphones and tablets, preservation of consumer's privacy related to RFID-tagged items that they leave a retail store with, and automatically reading and locating retail inventory without directly using store labor.

Methods and devices for automatically detecting the presence and location of retail store inventory are disclosed and for navigating shoppers to selected retail items of interest. RFID is used to help shoppers find what they want faster, optimizing their shopping time by efficiently presenting items that they are more likely to purchase and relying less on in-store sales labor and expertise. The RFID transponders preferably have privacy-preserving capabilities or features that prevent the promiscuous transmission of unique numbers from identifying articles of clothing that the consumer wears in public.

Robots of the present invention are optimized and narrowly disclosed and claimed for reading RFID tags in retail store environments where metal display racks and shelves reduce the read rate and inventory accuracy of systems that fail to avoid blinding reflections from typical indoor propagation environments. The present invention overcomes limitations of prior art by avoiding unwanted carrier signal reflection paths by using novel scanning devices, features, and methods.

DRAWINGS

FIG. 4 is a diagram of the data changes to transform a privacy preserving ready transponder in supply chain mode into a second consumer privacy mode with subsequent changes according to one embodiment of the present invention.

FIG. 5 is a diagram of the data changes to transform a privacy preserving ready transponder at a point of sale according to one embodiment of the present invention.

FIG. 21 is a side view diagram of an RFID transponder-reading robot with a computer touch screen and helical antenna according to one embodiment of the present invention.

FIG. 22 is a cutaway view of a preferred helical antenna and rear reflector.

FIG. 23 is a side view diagram of an RFID transponder-reading robot with a computer touch screen and high gain helical RFID antenna according to one embodiment of the present invention.

DESCRIPTION OF THE INVENTION

Figure 1:
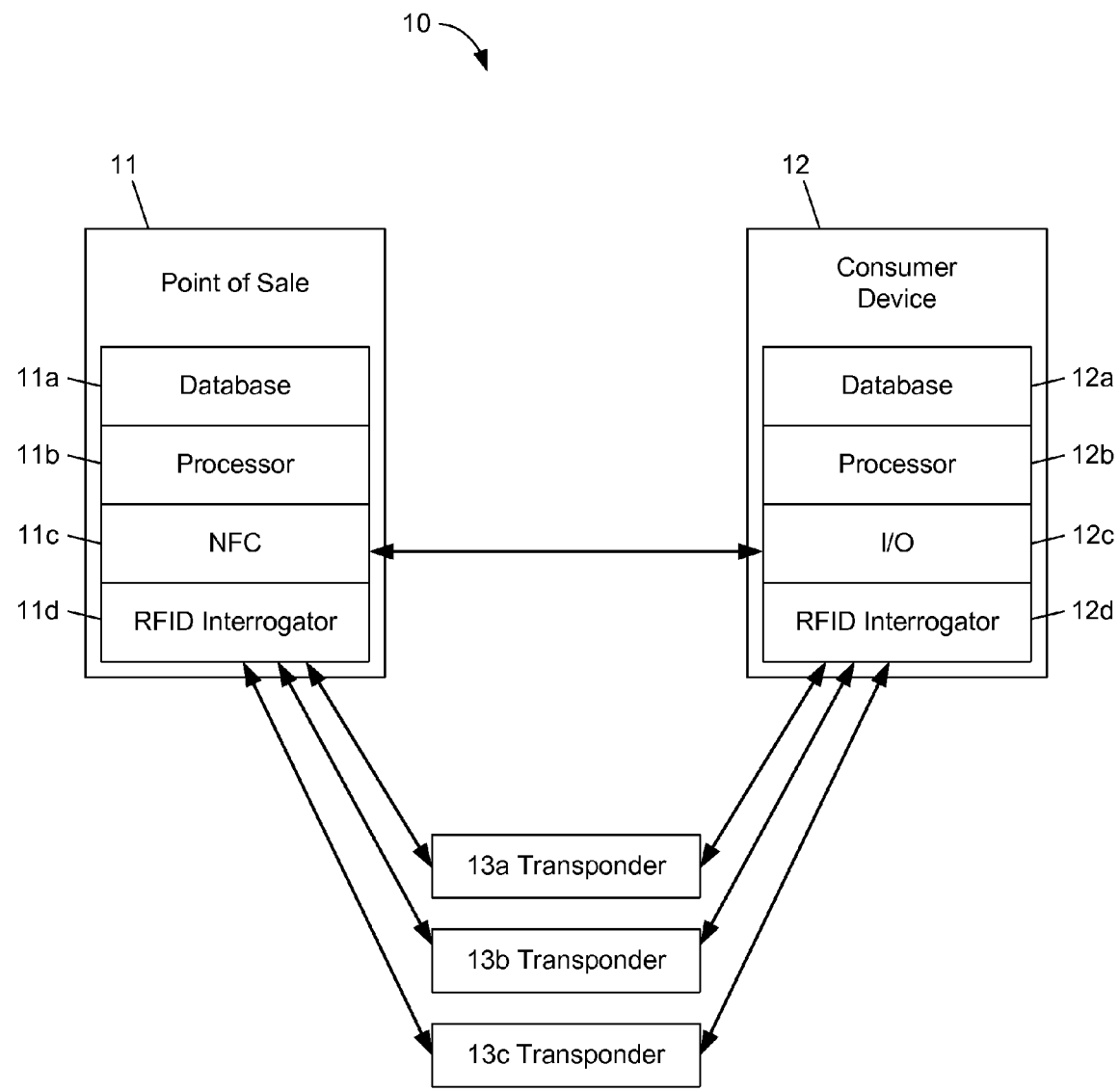
FIG. 1 is a block diagram of a privacy preserving RFID transponder system according to one embodiment of the present invention.

The present invention provides systems, methods, and devices for bridging online and physical retail environments and to automatically detect accurate inventory location. Consumers are utilizing online shipping to research what they want and save their choices in an online bag or cart. Downloading their bag of selected items into a mobile phone is a step in this consumer-centric shopping process. The next step is for an efficient high-touch shopping experience where the shopper and the retailer cooperate to experience more of what they both want by using less time from the shopper and the store employees. Both the shopper and the store spend less time and money in the steps that are required to complete a sale, and in the optimal case, the retailer sells more goods than without the present invention.

Making reference to various figures of the drawings, possible embodiments of the present invention are described and those skilled in the art will understand that alternative configurations and combinations of components may be substituted without subtracting from the invention. Also, in some figures certain components are omitted to more clearly illustrate the invention, similar features share common reference numbers.

To clarify certain aspects of the present invention, certain embodiments are described in a possible environment—as identification means for retail items that are bought and used by consumers. In these instances, certain methods make reference to items such as clothing, garments, shoes, consumables, electronics, and tires, but other items may be used by these methods. Certain embodiments of the present invention are directed for identifying objects using RFID transponders in supply chains, retail stores, and in consumer's homes.

Some terms are used interchangeably as a convenience and, accordingly, are not intended as a limitation. For example, transponder is a term for wireless sensors that is often used interchangeably with the term tags and the term inlay, which is used interchangeably with inlet. This document generally uses the term tag or RF tag to refer to passive inlay transponders, which do not include a battery, but include an antenna structure coupled to an RFID chip to form an inlay which is generally thin and flat and substantially co-planar and may be constructed on top of a layer of foam standoff, a dielectric material, or a folded substrate. One common type of passive inlay transponder further includes a pressure-sensitive adhesive backing positioned opposite an inlay carrier layer. Chipless RFID transponders are manufactured using polymers instead of silicon for cost reduction. Graphene tags offer similar benefits. Inlays are frequently embedded in hang tags, pocket flashers, product packaging, and smart labels. A third type: a battery-assist tag is a hybrid RFID transponder that uses a battery to power the RFID chip and a backscatter return link to the interrogator.

The systems, methods, and devices of the present invention utilize an RFID transponder or wireless sensors as a component. Certain RFID transponders and wireless sensors operate at Low Frequencies (LF), High Frequencies (HF), Ultra High Frequencies (UHF), and microwave frequencies. HF is the band of the electromagnetic spectrum that is centered around 13.56 MHz. UHF for RFID applications spans globally from about 860 MHz to 960 MHz. Transponders and tags responsive to these frequency bands generally have some form of antenna. For LF or HF there is typically an inductive loop. For UHF there is often an inductive element and one or more dipoles or a microstrip patch or other microstrip elements in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), phase jitter modulation, time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

Privacy Preservation

Preserving privacy is a concern. The present invention teaches how privacy preserving ready (PPR) EPC Class 1 Gen 2 transponders with privacy-preserving recommissioning features are coded to provide privacy for consumers that prefer to keep transponders operational after they acquire ownership of the tag and the object it is attached to. PPR tags are defined as having means for preserving privacy and lack unchangeable promiscuously readable serial number fields.

A first degree of privacy is defined as the elimination of uniqueness. Serial numbers are unique when combined with the object that they serialize. Removing all serial numbers from PPR tags removes publicly viewable uniqueness.

A second degree of privacy is achieved by changing the identity of the PPR transponder so that an attacker cannot rely upon previous observations of an item or a person for example wearing an item to confidently determine the identity of the item or person in the future.

The documents EPC Radio-Frequency Identification Protocols Class-1 Generation-2 UHF RFID Protocol for Communications at 860-960 MHz Version 1.2.0 and EPC Tag Data Standard Version 1.5 are incorporated by reference herein.

EPC Class 2 Gen 2 is under development. It is likely to someday become a standard transponder that offers a high degree of privacy preservation. Such a Class 2 PPR privacy preserving transponder will contain an internal cryptographic engine. Preferred embodiments will contain a random number generator and the ability to dynamically change its response to interrogation by RFID readers. Preferred PPR embodiments will use a cryptographic challenge-response protocol. Upon first use, the transponder will need to be initially impregnated with a secret cryptographic key or code.

Preferred embodiments of the present invention operate with either EPC Class 1 or Class 2 PPR transponders as a privacy preserving system by securely transferring control of item-identifying transponders between trading partners and consumers.

FIG. 1 shows a preferred system for privacy preservation using either EPC Class 1 or Class 2 PPR transponders. Point of Sale 11 has processor 11b and database 11a that contains information about each product for sale in the store as well as cryptographic keys and passwords to kill or recommission PPR transponders 13a,13b,13c for customers. Processor 11b runs an application program to control the transponder recommissioning process as is further disclosed in the discussion regarding FIG. 5 below. NFC 11c is used for communications with consumer device 12 using high frequency communications in the 13.56 MHz range. RFID Interrogator 11d communicates with transponders 13a, 13b, and 13c using ultra high frequencies (UHF) as is described in more detail during the discussion of FIG. 5.

Smartphones and Privacy-Preservation

Consumer device 12 is a device such as a mobile smart phone with database 12a for storing and accessing information about items purchased and owned by the customer. Preferred smart phones include iPhone4, 4S, 5 Android phones, and Win CE phones having processor 12b. Preferred embodiments use SQLite or other database for mobile devices. Also operating at UHF is RFID Interrogator 12d communicates with transponders 13a,b,c that are attached to retail items or the various hang tags that are attached to retail items. Preferred embodiments of RFID Interrogator 12d use austriamicrosystems AG of Unterpremstaetten, Austria model AS3992/3 UHF Gen 2 reader chip. Other preferred embodiments use the PR9000 from Phychips of Daejeon, Korea. I/O 12*c* preferably includes Wi-Fi, Bluetooth, and near field communications (NFC) for communicating with Point of Sale 11 and other devices.

Figure 2:
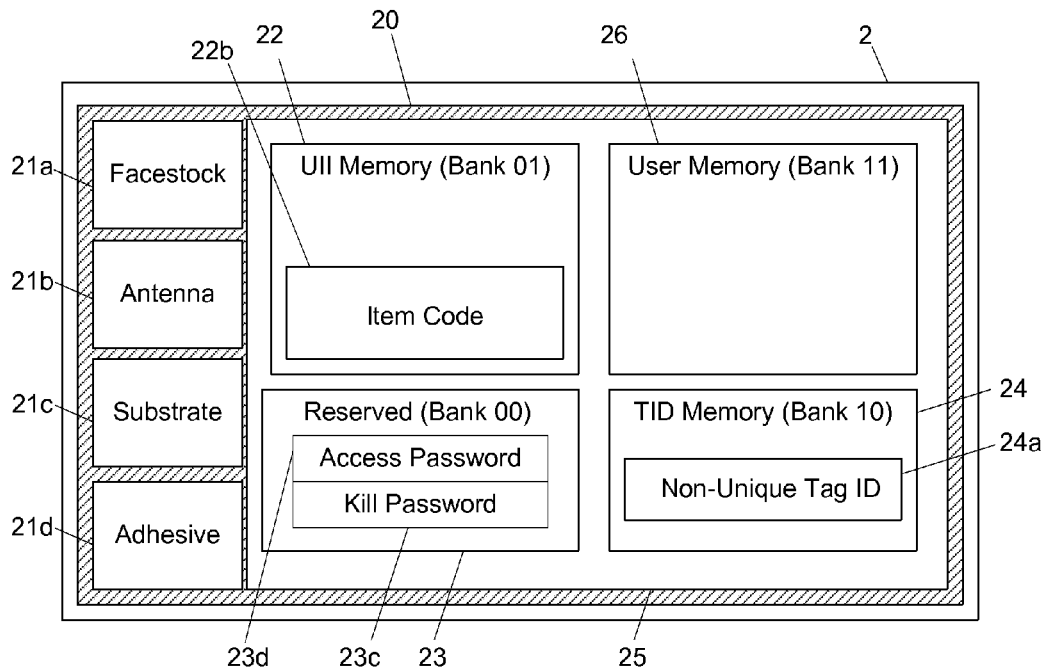
FIG. 2 is a block diagram of a privacy preserving RFID transponder in consumer privacy mode according to one embodiment of the present invention.

Referring to FIG. 2 item 2 is identified by privacy preserving transponder 20 which is comprised of RFID chip or chipless integrated circuit 25, optional face stock 21*a*, antenna 21*b*, optional substrate 21*c*, and optional adhesive layer 21*d*. Integrated circuit 25 is comprised of UII (Memory Bank 01) 22, optional User Memory (Bank 11) 26, Reserved (Bank 00) 23, and TID Memory (Bank 10) 24. UII Memory contains an identifier that is publicly readable by any RFID reader that singulates and reads the transponder. The privacy preserving features of PPR transponder 20 are described in more detail below. Access Password 23*d* is an EPC Class 1 access password and is preferably changed during a transfer of ownership from a retailer to a consumer. Item Code 22*b* is preferably a number that has very few significant bits. The non-significant bits of Item Code 22*b*, although present, do not pose a threat to privacy if the same bits are also non-significant in large populations of other consumers. In other words if consumers generally opt to have transponders with the same bits clear to zero or set to one, then many consumers would have the same bits at the same values and not be distinguishable from other people or objects and therefore does not significantly threaten privacy.

EPC Class 1 Gen 2 transponders promiscuously emit the contents of the UII (Bank 01) to any reader thus making that memory bank vulnerable to privacy attacks. The password registers in EPC memory Bank 00 however are not readable unless the transponder is in the secured state, and even then, only Kill Password 23*c* is readable. Therefore the only registers that can be used to hide a secret in a PPR EPC Class-1 Gen-2 compliant transponder are the Access Password 23*d* and Kill Password 23*c*.

PPR transponders will preferably not allow themselves to be programmed unless the interrogator can successfully unlock its secured memory banks. In a preferred embodiment each authorized RFID transponder converter company uses one or more encryption keys to generate passwords that lock the RF tags, whereby preventing them from being programmed unless they are unlocked using the same password. Passwords of this type are specified in the EPC Gen 2 specification and in ISO standards. The passwords are preferably generated by processing means using a public key from publicly readable data such as an asset number or a transponder serial number. A shared key is then used by an encryption algorithm such as AES in order to create a password or a collection of passwords to lock or unlock one or several RF tags.

For certain encoder embodiments, passwords are encoded into transponders or wireless sensors when they are commissioned. Passwords are safeguarded using cloaking, obfuscation, cryptographic techniques, secure and trusted channels, locked memory, and other methods that are commonly used to protect confidential information. Passwords are generated or retrieved from data encoded in an RFID transponder to generate an index into one or more databases that contain a one dimensional array of passwords, a two dimensional array of passwords, a multidimensional array of passwords, or an array of actual or pointers to algorithms used to generate passwords from transponder data, for example. Alternatively, cryptographic algorithms are used to generate passwords from transponder data.

This type of data production and/or replication process is very fast and efficient. There is no absolute need to query a database in real time; hence there is no need for continuous wireless network connectivity. This simplification eliminates the possibilities for non-deterministic network delays. Non-deterministic delays are delays that cannot be guaranteed, usually due to the probabilistic nature of packet collisions that are common in Ethernet and Wi-Fi. By eliminating the need to access a network database, the variable non-deterministic delays caused by changing database sizes, changing record counts, and database user load fluctuations are completely circumvented. Reduction or outright elimination of non-deterministic delays helps manual labor operate at maximum efficiency, allowing them to achieve a regular and dependable cadence in their transponder application processes.

Although serialized SGTIN's are vital to the functioning of transponders in supply chains, the uniqueness of the number poses a threat to consumer privacy. In preferred embodiments, unique SGTINs are produced using quasi-autonomous RFID transponder encoding. That is achieved when an external number issuance authority allocates to remotely located encoders, blocks of numbers for specific object classes. A preferred embodiment for quasi-autonomous transponder encoding authority is realized when large pre-authorized blocks of serial numbers are made available to encoder device to utilize on object classes as objects of a class are presented for tagging. A preferred method of providing large blocks of pre-authorized blocks of object class serial numbers is to subdivide the entire object class serial number space into sectors that are defined by a limited number of MSB's (Most Significant Bits) of the serial number field. The object class serial number space is defined by the number of serial number bits that are used in a specific standard, such as a particular EPCglobal key type, for example an SGTIN-96 and is defined in a corresponding specification such as the GS1 EPCglobal EPC Tag Data Standard. Again using the SGTIN-96 as an example, there are a total of 38 bits used to define the entire serial number space which contains $2^{38}$ unique numbers. For example the upper 14 bits could be designated as the most significant bits for a particular embodiment. In that case the object class serial number space would be comprised of 16,384 sectors. Since in this example there are 14 most significant bits within a 38 bit serial number field, there must be 38 minus 14 bits of lesser significance, which equals 24 bits. Therefore the lower 24 bits represent 16,777,216 unique serial number values. Once a sector is allocated to a lower level within an authority hierarchy, it is referred to as a block. Each allocated block of serial numbers represents authority for encoding objects of an object class that can either be used by an encoder for encoding transponders, or allocated to a lower level in the authority hierarchy.

GS1 is a leading global organization dedicated to the design and implementation of global standards and solutions to improve the efficiency & and visibility of supply and demand chains. GS1 defines EPCglobal SGTIN number fields as having a company prefix, an item reference, a partition value, and a filter value that comprise the object class information. A unique serial number is then added to that information to create each unique instance within each object class.

Use of object class numbers without the unique serial number described above is useful for privacy preservation. Object class numbers without the object class instance reveal no more information than a stock keeping unit number, GTIN, or UPC bar code.

For greater levels of privacy, publicly readable numbers are preferably changed from time to time. Preferred embodiments change the number every time the number is read, however this requires a transponder that is capable of changing its own numbers. Such a transponder within the EPC realm is possible within a category of new transponders that include EPC Class 2 Gen 2.

Preferred privacy preserving systems transfer unique serialized information that is associated with a PPR transponder to portions of transponder memory that can only be read by an authorized interrogator and also transfer unique serialized information to an authorized consumer device with data storage that is not generally accessible by an attacker or any unauthorized person or device.

Figure 3:
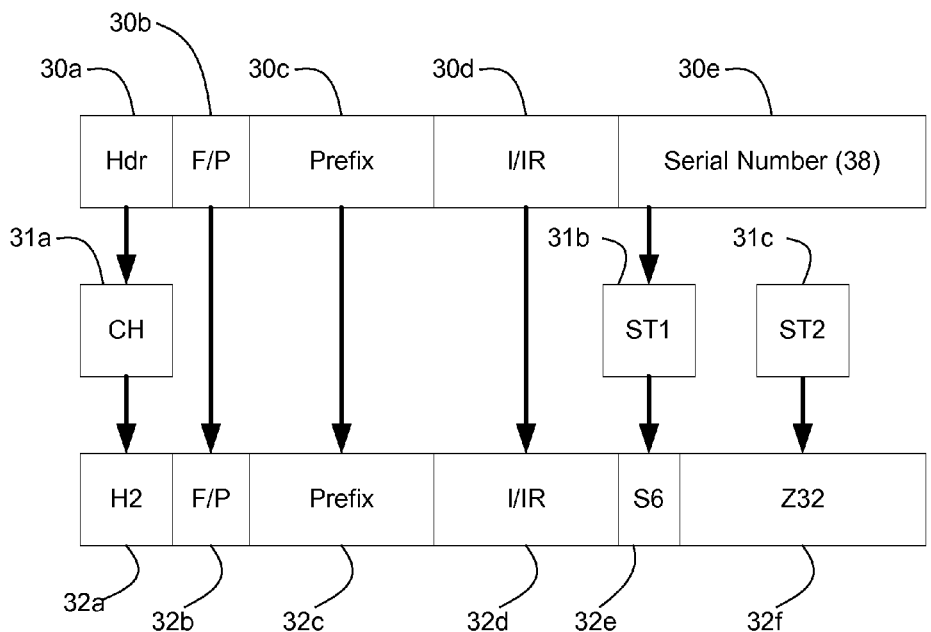
FIG. 3 is a diagram of the data changes to transform a privacy preserving ready supply chain transponder into a first consumer privacy mode according to one embodiment of the present invention.

FIG. 3 is a diagram of the data changes to transform a privacy preserving supply chain transponder into a first consumer privacy mode according to one embodiment of the present invention. In this embodiment, SGTIN header 30$a$ is transformed by header changing operation CH 31$a$ into privacy preserving header H2 32$a$ by implementing one of the unassigned header values described in the EPC Gen 2 specification. Filter/Partition values 30$b$ are copied directly or transformed into predetermined fixed values and stored in the corresponding bit positions F/P 32$b$. SGTIN Prefix 30$c$ and Indicator digit and item reference 30$d$ are copied into the corresponding bit positions Prefix 32$c$ and I/IR 32$d$ as shown in FIG. 3. The partition value of F/P 32$b$ can be for example changed to zero and the corresponding transformations would be made to Prefix 32$c$ and I/IR 32$d$ to correspond to partition value zero values and bit boundaries. Privacy preservation for this first consumer privacy mode ultimately lies in the removal of all or part of Serial Number 30$e$. Serial number transformation ST1 31$b$ is used to either copy the upper 6 bits of Serial Number 30$e$ into S6 32$e$ or to change the bits to a fixed value such as $111111_b$ or $000000_b$. Serial Number transformation ST2 31$c$ preferably converts all 32 bits to zero and stores them in Z32 32$f$. If ST1 31$b$ retained the original six bits from Serial Number 30$e$ and stored them in S6 32$e$ then the remaining 32 bits of Serial Number 30$e$ are preferably stored in Kill password 23$c$ where attackers cannot read the bits but the customer could restore the original SGTIN by reversing each of the transformations described here for FIG. 3. Thus a reversible privacy preservation PPR transponder 20 is realized.

Preferred embodiments of the present invention use Access Password 23$d$ and Kill Password 23$c$ for anti-cloning, anti-counterfeiting, authentication, and for consumers more detailed identification of the transponder while it is in this first privacy preserving mode. The reason for this is that secret information can be retained in Access Password 23$d$ and Kill Password 23$c$ as described above for FIG. 3.

Preferred embodiments retain a 32-bit portion of the 38-bit serial number (SN) 30$e$ in Kill Password 23$c$ which can only be read when the transponder is in the secured state. The process of changing a 38-bit SN to a 32-bit serial number has three preferred methods: Using a one-way hash to reduce 38 bits to a 32-bit digest; truncation of the 38 bits to 32 bits; or splitting the 38-bit SN 30$e$ into a 6-bit and a 32-bit portion.

The one-way hash function accepts a 38-bit serial number and produces a 32-bit message digest that is stored in Kill Password 23$c$. The truncation method replaces the six most significant bits with zeros or some other fixed value, and copies the lower 32 bits into Kill Password 23$c$. The hash and truncation methods are not reversible.

The split method retains the six most significant bits and copies the lower 32 bits into Kill Password 23$c$. Each method is useful for securely preserving a degree of uniqueness that is adequate for use at home by consumers.

Referring now to FIG. 4 is a diagram of the data changes to transform a privacy preserving transponder in supply chain mode into a second consumer privacy mode with subsequent changes according to one embodiment of the present invention. SGTIN header 30$a$ is transformed by header change transform CH 41$a$ into H3 42$a$ having a value that is currently available as an unassigned GS1 header value. Filter and partition values F/P 30$b$, Prefix 30$c$, I/IR 30$d$, and Serial Number 30$e$ are all converted to zero bit values in order to preserve privacy. The lower bits are transformed by asset number transform AN1 41$c$ into a locally unique asset number that is sufficient in length for a consumer to use at home. The resulting Asset ID 42$c$ is in preferred embodiments an extensible number that is able to be as short as possible until the consumer's accumulation of tagged assets grows and requires more bits to uniquely identify them all. For example, the number of bits for Asset ID 42$c$ may be comprised of 7 bits that are extensible to more bits as they may be needed by using non-zero values in the progressively higher order bit positions as needed. In this example, when the consumer needs a $128^{th}$ value, bit 7 is set to 1, whereby doubling the number of unique instances and gradually sacrificing privacy only as needed. Note that is large populations of other consumers are also using the same Asset ID numbers or numbers comprising a similar number of bits, then there will be little to distinguish one person or object from another in a crowded field of privacy preserving transponders of this second consumer privacy mode.

The consumer can subsequently and periodically change Asset ID 42$c$ into Asset ID 42$d$ using asset transformation AN2 41$d$. Increasing the frequency of use of AN2 generally results in an increase in privacy for the consumer. Such transformations are preferably performed outside of the range of potential eavesdroppers. Certain preferred embodiments use foil-linings inside of the walls of the rooms where process AN2 is performed. Additional anti-eavesdropping countermeasures preferably include radio signal absorbing foam, blocking tags, and active radio interference.

Figure 6:
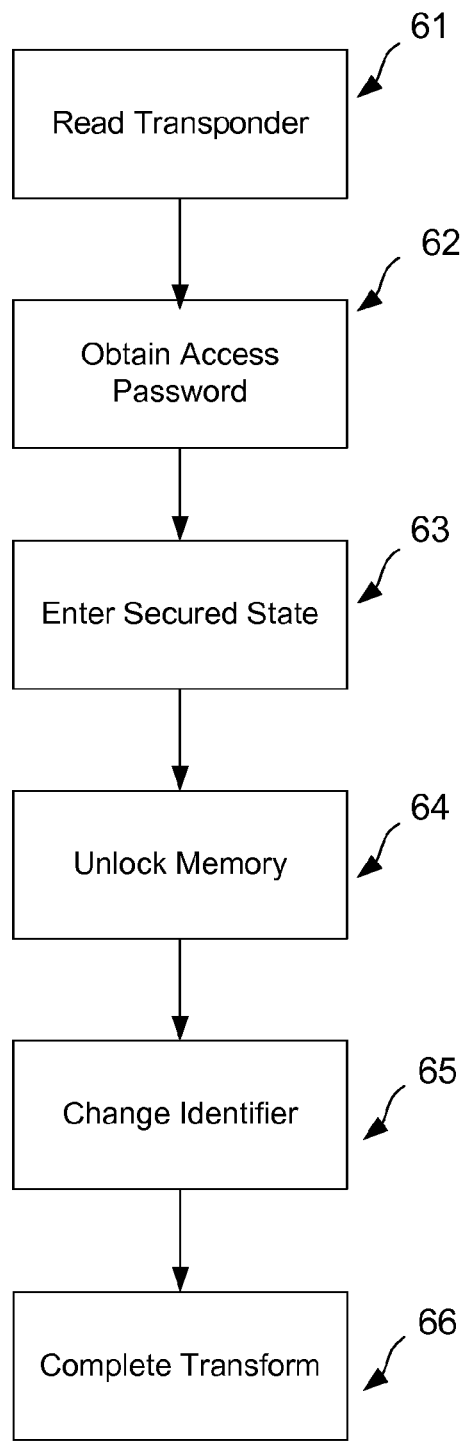
FIG. 6 is a flowchart of the steps to transform a recommissionable privacy preserving ready transponder from supply chain mode to consumer privacy mode according to one embodiment of the present invention.

Referring now to FIG. 5 is a diagram of the data exchanges to transform a privacy preserving transponder with recommissioning features at a point of sale and FIG. 6 is a flowchart of the process steps to transform a transponder with recommissioning features from supply chain mode to consumer privacy mode according to one embodiment of the present invention.

Referring now to FIG. 5 and then below to FIG. 6 preferred embodiments transfer SGTIN numbers to an authorized consumer device during the final steps of a purchase transaction. In an alternative embodiment, supply chain transponders are converted into privacy preserving transponders at a choke point for pedigree verification. For example a running shoe manufacturer embeds transponder 13$a$ into running shoes to control counterfeiting. Secret codes are preferably stored in the access and kill password for transponder authentication. Once the verification is performed, transponder 13$a$ is converted to a privacy preserving form prior to a purchase transaction in a retail store.

Returning now to the first embodiment, the consumer preferably acquires all rights to the items purchased and the SGTIN data that was stored on the transponder that was attached to that item. Point of sale device POS 11 preferably initiates a transaction with consumer device 12 such as a smart phone by sending to an appropriate I/O device 12$c$ Transaction Request 14$a$. The request is preferably comprised of POS authentication and identification information. Consumer device 12 preferably responds with a list of Item Identifiers 14$b$ that correspond to Asset ID 42$c$ of FIG. 4 where each of the consumer's tagged purchases are recommissioned with locally unique asset numbers. POS 11 responds by recommissioning each transponder on each item purchased using the provided list of asset identifiers. The unlock 14*c* command is sent to one of transponders 13*a*, 13*b*, or 13*c*, which then responds with Ack 14*d*. There are two different recommissioning processes for recommissionable transponders 13*a*-*c*, one which uses the access password and the other that uses the kill password and kill command with non-zero RFU/Recom bits. Using the access password requires the sub-steps of transitioning the transponder to the secured state and then altering the lock bits so that the UII memory, and possibly the kill password memory banks are unlocked and able to be reprogrammed. Use of the RFU/Recom bits in the kill command with 3SB asserted results in the EPC, TID, and User Memory being unlocked except for portions that were factory permalocked in which case they shall remain permalocked. The more that can be erased or disabled the better for privacy preservation. To that end, asserting 2SB will render User Memory unreadable, unwriteable, and unselectable whereby contributing to privacy preservation. This latter recommissioning process using RFU/Recom cannot be repeated for any transponder, it can only be performed at most once on any given PPR transponder.

Asset ID setting operation 14*e* is the step that implements one of the transformations shown in FIG. 3 or FIG. 4 along with clearing or altering other EPC memory banks to reduce the amount of distinguishable information that a privacy attacker could use from either a single transponder or from a collection of transponders on the same person. The completion of that step is then acknowledged by Ack 14*f* from the transponder as either a single Ack or a series of acknowledgements to operations on multiple memory banks.

POS 11 in preferred embodiments provides Transaction ID 14*g* to PPR transponder 13*a* to store in the kill password such that it cannot be read by a privacy attacker. This step is in lieu of a step described above where the lower 32 bits of Serial Number 30*e* are stored in Kill Password 23*c*. This Transaction ID is preferably a 32-bit number that is unique within a retailer's transaction database such that it could be used by a retailer to confirm a transaction when the corresponding customer returns an item for exchange or refund. During the returns process the original SGTIN could be rewritten to PPR transponder 13*a*, preferably with the original access and kill passwords in reserved memory 23 that were preferably saved in the retailer's store computer system. Ack 14*h* is then preferably sent by PPR transponder 13*a* to POS 11.

POS 11 then completes the recommissioning process by either the access or kill password method by locking the transponder memory banks. Memory Lock 14*i* is used to set lock bits for UII Memory 22, User Memory 26, Access Password 23*d*, and Kill Password 23*c*. Ack 14*j* is the confirmation from transponder 13*a* to complete this process. Transponder 13*a* is then preferably returned to the ready or arbitrate state before powering it down.

Confirmation step 14*k* preferably includes the transfer of all SGTIN numbers and the associated Asset ID numbers 42*c* to Consumer Device 12 through I/O 12*c* for storage in database 12*a*. Consumer device 12 then preferably replies with Acknowledgement 14*m* to complete the recommissioning process for all transponders in the consumer's present purchase transaction.

Referring now to FIG. 6 in step 61 transponder 13*a* is read to determine the EPC number, stored PC, an optional XPC_W1, and an optional XPC_W2 to determine if transponder 13*a* implements standard EPC recommissioning.

In step 62 POS 11 obtains either an access password or a kill password based on whether transponder 13*a* was found to implement standard EPC recommissioning or not. If transponder 13*a* does implement standard EPC recommissioning but has already been recommissioned, then the transponder cannot be recommissioned a second time. Obtaining the required password is preferably a cryptographic process in which publicly readable transponder data is used with a cryptographic key and a cryptographic transform to produce a cryptographic result that is used all or in part as a password. For EPC Class 2 transponders secure privacy preserving access to the transponder may or may not use the passwords and XPC bits as defined for EPC Class 1 transponders.

In step 63 transponder 13*a* enters the secured state where it can execute all access commands and change lockbits. Preferred embodiments of EPC Class 2 transponders have the same or a corresponding state that is indicative of authorized transponder access.

In step 64 lockbits are reset in order to provide access to memory banks that are to be cleared or rewritten during the recommissioning process.

In step 65 preferred embodiments change UII Memory 22 according to the transformations shown in either FIG. 3 or FIG. 4 to a privacy preserving number that has a greatly reduced number of significant bits compared to a standard SGTIN. In FIG. 3 Serial Number 30*e* has either 32 or all 38 bits cleared to zero. In FIG. 4 the SGTIN is replaced by Asset ID 42*c*.

In step 66 the transformation is completed preferably by locking memory banks that were changed and exiting the secured state to the ready or arbitrate state. A corresponding action is preferably performed in embodiments that use EPC Class 2 privacy preserving transponders to return them to a non-privileged state for use in public.

Non-Unique Tag ID 24*a* is typically written and permalocked when the RFID chip or inlay is manufactured. If this number does not have a unique serial number concatenated onto a base number that identifies the manufacturer and model number of the RFID logic circuit, then it can be used in a privacy preserving transponder as a Non-Unique Tag ID 24*a*. On the contrary if TID Memory Bank 10 contains a TID with a unique foundry-serialized number that cannot be muted, masked, erased, or truncated, then it poses a high risk to privacy since it too is promiscuously readable by any RFID reader. Impinj of Seattle, Wash. promotes the use of serialized TID numbers for UII serialization. A transponder with a unique TID that is completely factory permalocked should not be used if privacy preservation is a requirement.

User Memory (Bank 11) 26 if it exists in a particular transponder is preferably disabled or cleared to all zeros in order to eliminate potentially distinguishable information. Certain supply chain applications make use of User Memory 26 for supplemental information. The UMI (User Memory Indicator) bit should therefore be clear. The UMI bit is PC bit 15*h* as defined in the EPC Tag Data Standard.

Extended Protocol Control (XPC) bits are also somewhat distinctive and pose a threat to privacy if an attacker can use distinctive XPC bit patterns to help identify a person or item with higher confidence.

The benefit of PPR privacy preserving transponders is apparent when consumers use supply chain transponders at home in combination with PPR transponders in retail stores. For example a person holding consumer device 12 such as a mobile smart phone with visual and audio inputs and outputs would in a preferred embodiment use a voice assistant such as the Apple SIRI or Android IRIS to ask the mobile computer questions such as: "What pants, belt, and shoes should I buy to go with my blue shirt at home?"

Preferred embodiments include a retail shopping store having a plurality of objects, each having a unique code stored in an attached RFID transponder. The RFID transponder is preferably responsive to radio signals in the 860 MHz to 960 MHz range.

The mobile computer is preferably a smart phone or tablet computer equipped with an RFID reader. The RFID reader is preferably embedded in the mobile computer, but can also be mounted externally from the mobile computer's enclosure. In preferred embodiment a consumer's smart phone connects with RFID readers that are operational within a retail store. Wireless data can be provided through a connection or a connectionless transfer of data packets. Wi-Fi or Bluetooth are preferred for such wireless data transfers. TCP packets would be for connection to a socket on a store server or UDP packets can be received in a broadcast mode of operation from RFID readers that multiple listeners can all have realtime shared access to raw RFID read data in a retail store if there is adequate bandwidth to convey the data traffic.

Conversation with the mobile computer is preferably natural and fluid, with suggestions that arise from coded data that is representative of your tastes, your existing wardrobe, your budget, and what is currently on the sales floor, preferably on sale!

RFID smart phone and tablet Apps enable dialog like: "Show me how this couch would look in my living room" or "Are all my clothes back from the dry cleaners?".

In a possible embodiment, a PPR transponder includes mechanically alterable characteristics that result in a reduced operating range. For example RFID transponders with detachable antenna material have been proposed as a solution for increasing consumer privacy for goods after they leave the point of sale. A problem with this solution is that once the antenna material has been removed, it cannot, in general be reattached. In other words the privacy preservation step is not reversible.

Certain PPR privacy preserving transponders are sewn in to garments. Transponders are preferably encoded when the sewn-in transponder is being sewn in to the garment. Preferred embodiments also encode security information such as pedigree assurance codes into the transponder at that point in the product lifecycle.

Figure 8:
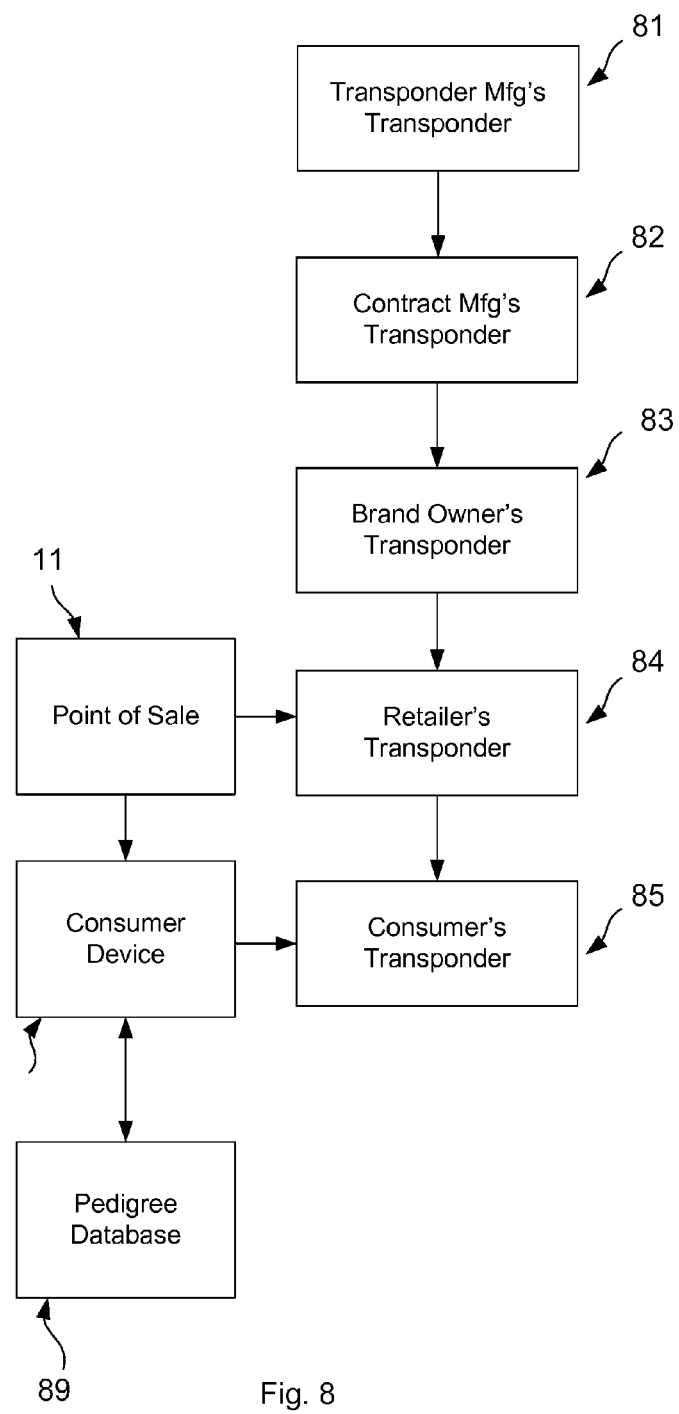
FIG. 8 is a diagram of the life cycle of a privacy preserving ready transponder with pedigree confirmation according to one embodiment of the present invention.

For a consumer to use RFID transponders at home, some consumers may wish to be assured that the royalties have been paid. Preferred embodiments use the acquired SGTIN information to determine pedigree and authenticity of the purchased goods and preferably reward shoppers for their cooperation Referring now to FIG. 8 is a diagram of the life cycle of a privacy preserving transponder according to one embodiment of the present invention. At lifecycle stage 81 transponder 13a is manufactured preferably using silicon or polymers to create circuits that are compliant with EPC standards. TID Memory 24 is preferably written with Non-Unique Tag ID 24a or with a unique serialized Tag ID that although permalocked has a serialized portion that can be cleared during a recommissioning process as described above.

At stage 82 transponder 13a is used by a contract manufacturer or a brand owner's manufacturing plant to identify retail items using a uniquely serialized SGTIN. Preferred methods for serialization are described above, including quasi-autonomous encoding to remotely assure uniqueness at any manufacturing location in the world.

At stage 83 the transponder is used by the brand owner to transfer items to retail stores using RFID uniqueness for product visibility.

At stage 84 transponder 13a is used by a retailer to track and count inventory which again requires each transponder 13a to be uniquely numbered.

Figure 9:
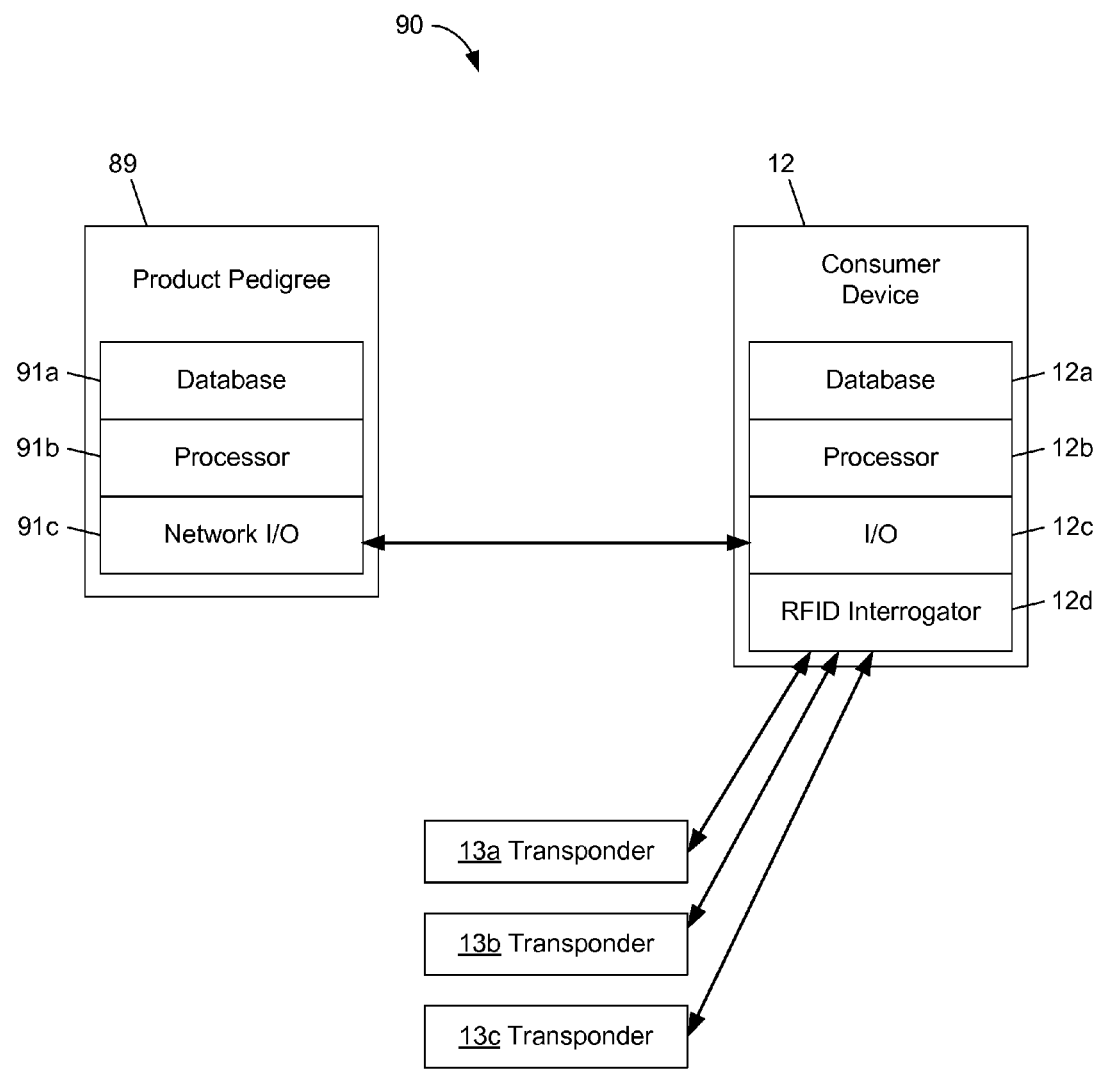
FIG. 9 is a system diagram of a product pedigree system according to one embodiment of the present invention.

At stage 89 a pedigree database 91a is queried through Network I/O 91c and 12c using software running on processor 91b and 12b, preferably prior to making a purchase of item tagged with transponders 13a-c using Consumer Device 12, database 12a, and RFID Interrogator 12d according to the diagram shown in FIG. 9 and as described below.

At stage 85 a customer buys the retail item and the transponder that is attached to it. POS 11, Consumer Device 12, and transponder 13a implement a data exchange according to the method illustrated in FIG. 5 or some variant thereof to hide or remove uniqueness from transponder 13a.

RFID-Enabled Smartphones

Retail sales are increasingly becoming a multi-channel business that involves three complimentary channels: in-store, online, and catalog sales. Retail store inventory is increasingly used to fulfill online and catalog orders and is a major reason that inventory accuracy is preferably at least 97% accurate. Consumers are increasingly planning in-store shopping visits to retail stores by shopping online first and saving items of interest to an online shopping bag or wish list. That list is then optimally used to find, touch, and try selected items while the shopper is in the retail store, presumably using precious time and wishing to focus mainly on items of interest.

Shoppers use smart phones to look up products online using bar codes, RFID, or visual object recognition to identify products of interest. Shoppers access coupons in smart phones and purchase items online when products are out of stock at store.

Smart phones provide an immersive shopping experience, customer check-in and check-out, and a high degree of customer service and retailers learn shopper behaviors.

To focus on items of interest the shopper needs to know where to go in the store to see and feel the items such as apparel, footwear, and electronics. A preferred way to do this is to use an in-store map or planogram to locate items.

For a planogram-based in-store mapping system to work effectively, inventory chaos must be controlled and limited to a minimum level. Inventory clearance sales are a particular problem for retailers because eager shoppers are physically very disruptive to inventory, resulting in vast amounts of misplaced and messed up merchandise. Store employees work to restore order during these high velocity sales. RFID tagging can help make this process work more efficiently by guiding the employee to the misplaced items so that they can be returned to the place that they should be in, as is preferably indicated in the store planogram.

In other preferred embodiments, handheld RFID readers are used to periodically scan store inventory and in that process also reading RFID transponders that indicate physical positions within the retail store. GS1 recommends that SGLN encodings be used for reporting a transponder's physical location. Whenever inventory items are read they are correlated with a position that maps to the store planogram.

Near real-time item position information is preferably updated as on hand store floor inventory that maintains a high correlation to the store planogram. This method then enables a more efficient and successful bridging of the online and in-store shopping experiences by making it easier for shoppers to find what they are looking for, in their preferred style, size, and color.

Figure 10:
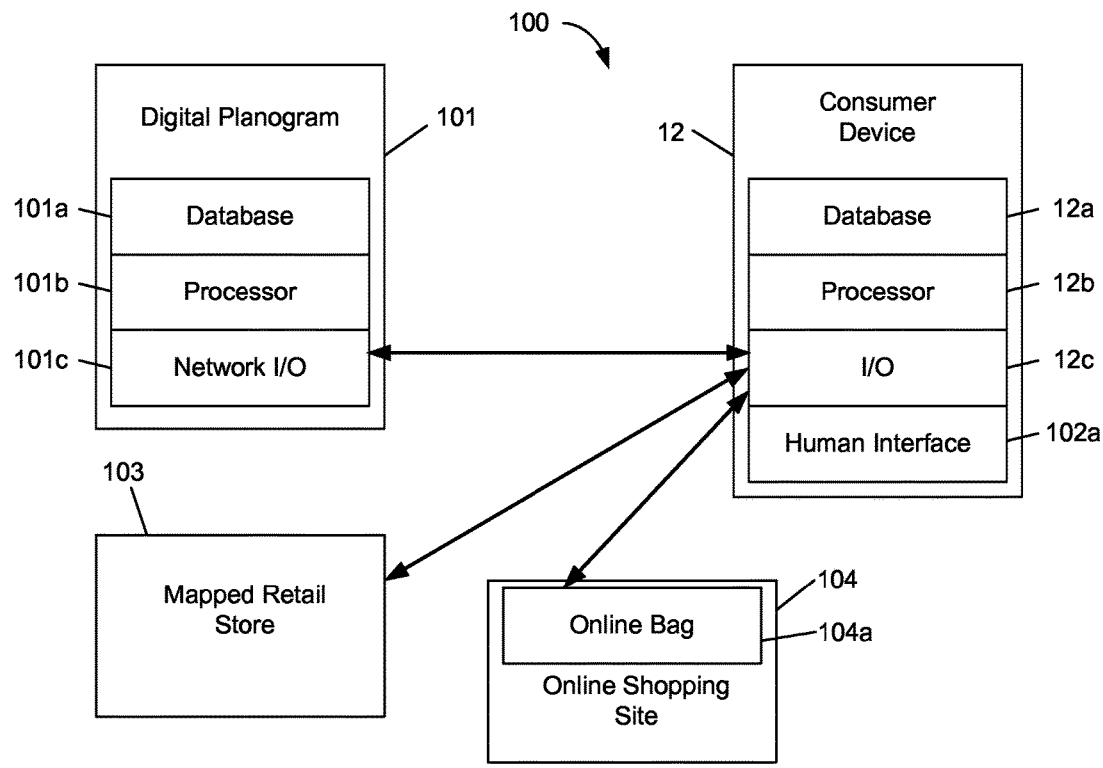
FIG. 10 is a system diagram of a retail store navigation system according to one embodiment of the present invention.

Referring now to FIG. 10 an indoor navigation system is used to direct a shopper to the physical location of items that are in the shopper's Online Bag 104a that is integrated into Online Shopping Site 104.

Mapped Retail Store 103 is preferably adapted for use by an indoor navigation system and includes points of reference such as radio beacons such as DASH7 (ISO18000-7 433 MHz) or extensions of Bluetooth 4.0 nodes and Wi-Fi access points, RFID transponders such as UHF or NFC tags, optical references such as barcodes, LEDs, lamps, light fixtures, or overhead optical location reference strips 160.

Digital Planogram 101 is comprised of database 101a that contains a detailed map of the locations of each stock keeping unit (SKU). Each SKU maps to a GTIN and each GTIN maps to one or more serialized SGTIN instances. Processor 101b works with Network I/O 101c to serve planogram content to consumers that are using either online shopping tools or mobile devices such as smart phones. Consumer Device 12 is such a tablet or smart phone device that is used by the shopper as an interactive shopping tool. Certain retailers preferably offer the use of a tablet such as an Apple iPad, Samsung Galaxy Tab, or a commercial grade tablet such as a Motorola tablet for consumers to use while shopping in their retail store to help them locate and find information about products that they are interested in. Preferably Consumer Device 12 also performs as a point of sale to present a list of items as a transaction, tender the sale, and complete a transaction as previously described for POS 11 and Consumer Device 12 as separate devices could be combined and performed in a single device.

Figure 11:
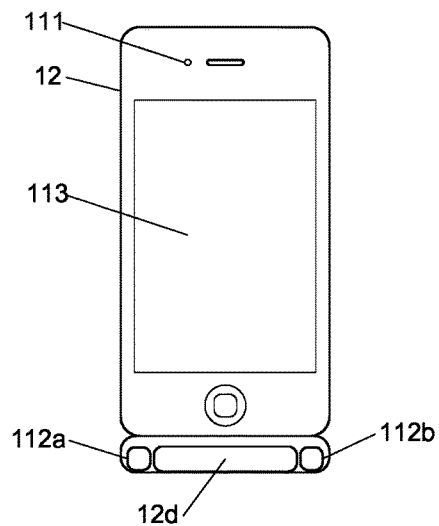
FIG. 11 is a smart phone with a camera that is used for in-store navigation according to one embodiment of the present invention.

Preferred embodiments use augmented reality to enhance the shopper's experience in a retail store by for example superimposing three dimensional views of objects into a scene that is viewed by camera 111 in tablet or smart phone 12 or camera 198 in tablet 197 of FIGS. 21-25 and displayed on color display 113 of FIG. 11. Augmented reality refers to an overlay of meta data on the image that is captured by the tablet camera. The shopper can more easily visualize what a product or an article of clothing would look like on him or her by using augmented reality in combination with RFID to identify the items that the shopper wishes to quickly experience without actually trying it on in a changing room. In a preferred embodiment, augmented reality is used to superimpose guidance information onto the forward-looking camera view in order to guide the shopper to items of interest which may be located in a nearby part of the store. Guidance uses indoor navigation systems, devices, and methods as described below.

Database 12a preferably contains a copy of the shopper's online shopping bag that indicates the items that the shopper is interested in seeing, touching, and potentially buying. Processor 12b operates preferred application programs that provide one or more layers of content onto a representation of the physical store in which the shopper is looking for items of interest. The application uses I/O 12c including smart phone sensors to sense points of reference such as radio beacons such as Bluetooth nodes and Wi-Fi access points, RFID transponders such as UHF or NFC tags, optical references such as barcodes, LEDs, lamps, or light fixtures that are sensed by a camera. Accelerometers and magnetometers are also used in preferred embodiments as sensed dynamic inputs that are used between any of the fixed points of reference described above.

The shopper is shown and guided to items of probable interest using Human Interface 102a that preferably includes a high resolution color display and audio cues including synthesized voice and audio tones.

Referring to FIG. 11 is a preferred embodiment of Consumer Device 12 with a camera 111 for capturing images from inside of a retail store. Using graphics processing hardware and software, optical points of reference can be identified and decoded as is described in more detail below. RFID interrogator 12d is optionally used for consumer device 12 to read nearby RFID transponders. The range and performance of RFID interrogator 12d is enhanced by reading transponders during timeslots when high power RFID readers briefly stop sending power to passive transponders while they still retain enough power to respond to interrogation by backscattering data to interrogator 12d. In another preferred embodiment, RFID interrogator operates in an eavesdropping mode while the retailer's high power RFID readers interrogate a population of tags. The advantage of using eavesdropping in this manner is that interrogator 12d and antennae 112a and 112b operate at very low power levels, whereby minimizing power and energy demand from consumer device 12.

Preferred embodiments of retail stores use fixed readers such as reader 180 at points of interest for shoppers to use their personal consumer device 12 having RFID reader 12d eavesdrop by synchronizing with the RF hop sequence of the store's readers. The hop sequence is preferably published to consumer devices 12 using Wi-Fi UDP broadcast packets that also serve to synchronize the hop times of readers in the store. If all readers, including consumer devices 12 use the same hop sequence, then reader 12d can sense that it is close to a reader that is at a certain place in the prescribed hop sequence and tune to that frequency, whereby enabling it to down convert to base band the data that the store's reader sends and receives from a population of transponders.

Automated Inventory Reading

Automatic and methodical reading of item-level RFID-tagged inventory without the use of direct human labor is herein disclosed comprising mobile devices with either aerial or floor-level mobility for methodically scanning a plurality of RFID transponders.

Figure 12:
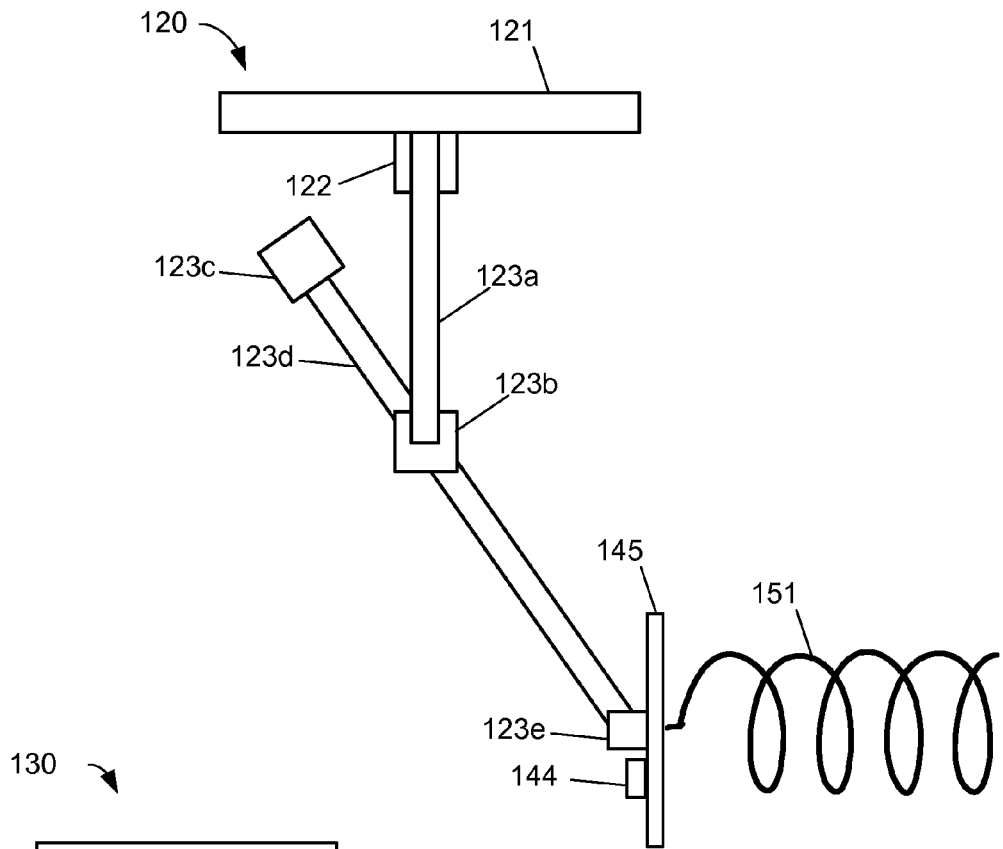
FIG. 12 is side view of an aerial mobile RFID reader system according to one embodiment of the present invention.

Referring now to FIG. 12 is an aerial mobile high gain RFID robot 120 with circularly polarized antenna preferably formed by helical 151 and ground plane 145. This antenna is aerially suspended overhead, connecting to a database through RFID to Wi-Fi bridge 144. Track 121 is used to laterally move carriage 122 along track 121 using servo motors or stepper motors for displacement. Track 121 preferably has power distributed along its length such that carriage 122 operates like a monorail train or an electric bus that draws power from exposed conductors along its length. Carriage 122 preferably uses linear encoders or rotary shaft encoders for position sensing and uses that information to compute a first order calculation of the location of the RFID reader within the store. Carriage 122 preferably includes a rotary joint that rotates vertical member 123a around a vertical axis of rotation. Joint and gearbox 123b causes member 123d to pivot in a vertical plane. Battery 123c provides power and acts as a counterbalance against the RFID reader that is defined by ground plane 145 and helical 151. Joint and gearbox 123e control the pitch of ground plane 145 and helical 151 such that they can be oriented in a wide range of angles relative to the tagged merchandize, giving the tags a view from many different angles while maintaining a focused circularly polarized beam of RF energy on the transponder population of interest. These multiple methodical views increases overall transponder read rates by reducing the probability that a tag is missed because its only view was blinded by reflection, or it was not illuminated. Assuming that ground plane 145 has a 10.3" reflector diameter and helical 151 an overall coil length of 26", the resulting gain would be 20 dBic and half-power beam width would be 34 degrees that can be directed at merchandise from many different angles along walls or on the retail floor displays and racks.

Figure 15:
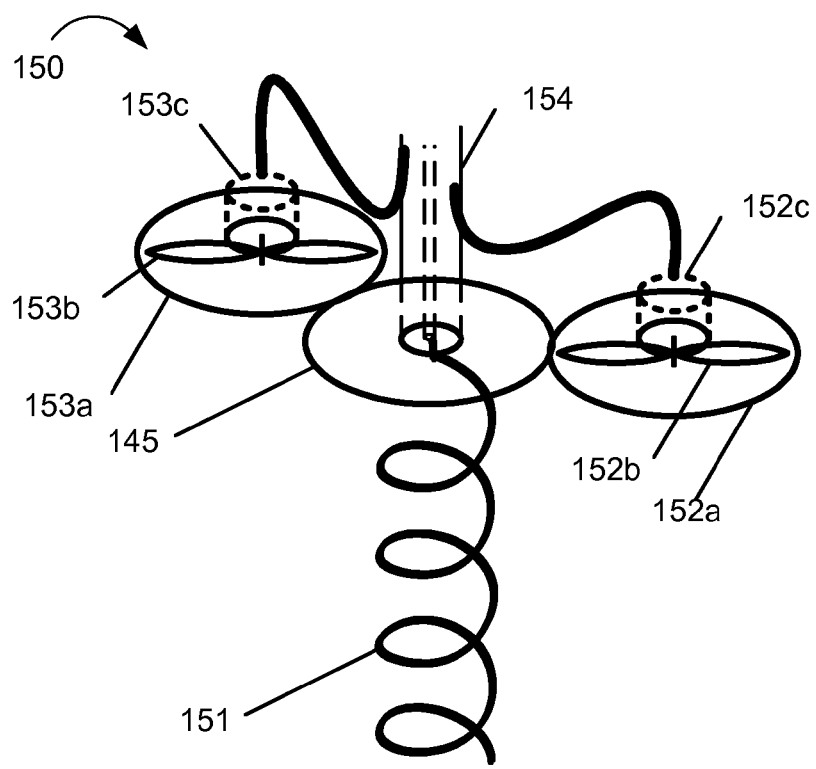
FIG. 15 is a helical antenna according to one embodiment of the present invention.

FIG. 15 is a preferred embodiment of RFID antenna 150 that includes propulsion for redirecting antenna 150 and helical 151 in a preferred direction from its tether cable 154. Tether cable 154 conducts power and communications to a base unit. a sufficient length and propellers 152b and 153b are rotating at a sufficient angular velocity, then antenna 150 will point in a direction that is offset from a vertical axis. As angular velocity of propellers 152b and 153b increase equally and tension in cable 154 increases as an opposing force, then antenna 150 will be directed to an angle with a significant horizontal component that is sufficient for scanning a vertically aligned collection of RFID tagged items such as those arranged on a shelf in a retail store. A slight difference in angular velocity of propellers 152b and 153b will result in a lateral redirection of antenna 150 around the center of mounting plate 143a. The more massive part of antenna 150 with propellers 152b and 153b, propeller frames 152a and 153a, and motors 152c and 153c will be drawn by gravity to be below the center point of ground plane 145.

The length of tether cable 154 is preferably varied by a servo-controlled winch (not shown); varying the length of tether cable 154 and the individual velocities of propellers 152b and 153b provide complete freedom for controlled scanning of tagged items located throughout a room such as a retail store with a high gain antenna that provides a high degree of transponder location resolution. The tether location and deflection angles, deployed cable length, are used to compute transponder locations.

In another preferred embodiment, one or more of propellers 152b and 153b are coaxially aligned with helical antenna 151. Propulsion and helical antenna are preferably enclosed within a protective plastic cylinder that is open at both ends whereby allowing air to flow through the tube. Direction of air and radio waves results in a highly directional RFID tag reading system.

In another preferred embodiment, flexible or rigid tether cable 154 is suspended from a dual or single mast 255a that extends above robot 250.

Hierarchical SGTIN Storage and Retrieval

Figure 13:
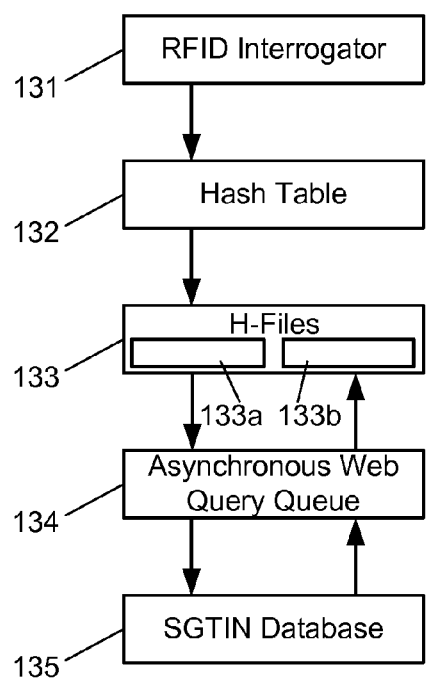
FIG. 13 is a system for finding and verifying inventory according to one embodiment of the present invention.

Referring to FIG. 13 is a system 130 for finding and verifying inventory using a plurality of RFID transponders, RFID interrogator 131, an item database 135 of item records, a hash table 132 of recently found SGTIN-marked items, a hierarchical file system 133 comprising segments of the SGTIN, a cluster reconciliation table or map 133a comprised of at least one bit per SGTIN instance, and a queue of cluster reconciliation reports 134 for the item database 135. In this preferred embodiment, the process of verifying store inventory reaches a maximum efficiency when several items of the same object class, or SKU are all clustered near to each other and numbered with the GS1 SGTIN numbering system such that their SGTIN's differ only in their trailing few bits. Efficiency of verifying inventory is maximized when a cluster of SGTIN's sharing the same 22 leading hexadecimal digits for example are essentially reconciled at the same time against a file, table, or map that is loaded into memory or a local file storage device. A binary file is preferred.

The 22 leading hexadecimal digits, or embodiments using base ten or other bases can be broken down into components as follows to create a hierarchy of directories or folders for hierarchical H-Files. In another embodiment, the 22 leading hex digits are used as a primary key into an SQL database, however tests have shown that this results in a data storage and retrieval solution that is slower than the H-Files that are described here: tag inst=30048677B2A47FC0004E9927; Dir: \30\04\86\77\B2\A4\7F\C0\00\4E; Path name=\TDB\\30\04\86\77\B2\A4\7F\C0\00\4E\99.txt.

In this example, the first 20 hex characters are used two at a time to create a hierarchy of directory names. The second to last SGTIN hex character pair is used to form the file name. The last two characters are used to encode the instance in a cluster map 133a as described in more detail below.

In a preferred embodiment, a Motorola MC3190Z handheld RFID reader using C# language running on a .NET is used for inventory counting in a retail store. Comparing SQL to H-File on a 100,000 SGTIN instances that are for the most part sequentially numbered, the following results were obtained for binary files. Speed: H-File: 65.4 recs per second (6.7x better), SQL: 9.8 recs per second. Storage: H-File: 0.28 Bytes per SGTIN (4.6x better), SQL: 1.30 Bytes per SGTIN.

Figure 7:
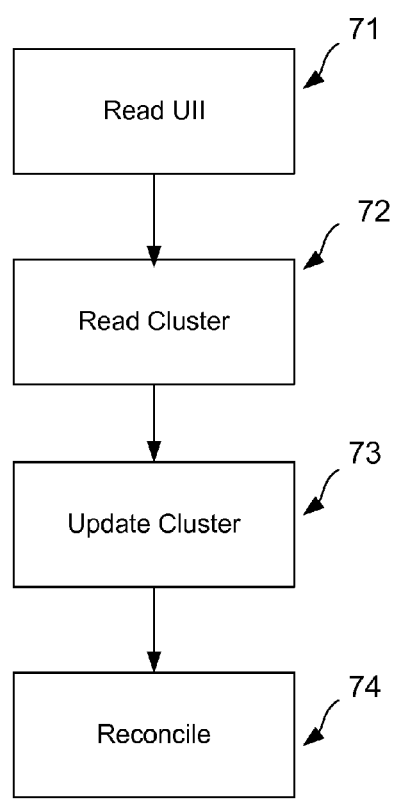
FIG. 7 is a flowchart of the steps to verify inventory in clusters according to one embodiment of the present invention.

FIG. 7 is a flowchart of the steps to verify inventory in clusters. In a preferred embodiment cluster map 133a is comprised of 256 instances of SGTIN's that share the same 22 leading hex characters and are each tracked using two bits to encode each of four possible states: state of being unexpected and unfound; an unexpected but found state; a commissioned and unfound state; and a commissioned and found state.

When RFID interrogator 131 reads a transponder SGTIN, as shown in step 71, it is used as a key into hash table 132 which is used to temporarily store all instances of recently read transponders. Hash table 132 can either store one instance per record, or ranges of consecutive instances such that the efficiency of hash table memory is maximized. Using that read event, hash table 132 is then searched for all other SGTIN's that share the same 22 of 24 leading hex characters and setting the bits in cluster map 133a that correspond to those instances. That cluster can then be saved in local file storage and another SGTIN is processed in a similar manner. High efficiency is realized when clusters each have dozens or more of instances found and verified at one time before the relatively slower operation of file storage is performed.

In step 72, asynchronous web query queue 134 is used to read cluster maps 133a from SGTIN server 135 which may be in the store, or remotely located at an Internet IP address. Since network and database delays are non deterministic, the database query process preferably operates in the background so as to not block the progress of the main processing thread.

In step 73, the inventory cluster maps 133a is updated whenever instances of the SGTIN's in that cluster are found through reading of its RFID transponder. Clusters are preferably updated several instances at one time before storing that cluster in a local data storage file or SQL record. In an exemplary embodiment the cluster file is 64 bytes of 256 binary encoded 2-bit pairs for a total of 512 bits.

Results that are returned from SGTIN server 135 are SGTIN cluster maps and GTIN's or product descriptions that are used primarily to help a retail store associate identify items that do not match during the inventory processing steps described above. In many cases the GTIN can be computed directly from the SGTIN, however due to mistakes or license plate tagging, the GTIN must sometimes be fetched from the database. GTIN list 133*b* is then preferably used to store instances or ranges of SGTIN instances that correspond to a GTIN. For example a preferred list is stored in a hierarchical H-File manner in the same folder as the corresponding cluster map 133*a* in a directory hierarchy comprised of pairs of SGTIN hex digits.

In step 74, asynchronous web query queue 134 is used to write or store updated cluster maps 133*a* to SGTIN server 135, whereby indicating to server 135 which instances were found in the retail store. Step 74 preferably includes a reconciliation process that is responsive to the four possible states: an inventory item state of being unexpected and unfound; an unexpected but found state; a commissioned and unfound state; and a commissioned and found state. At a certain point, after the store has been completely scanned, there is a final reconciliation step to resolve occurrences of the a commissioned and unfound state and the unexpected but found state. The former may indicate an item that has been lost, stolen, or transferred to another store. The latter may indicate an item that was returned or exchanged but not properly accounted for.

Aerial Mobile and Overhead RFID Readers and Bridges

Figure 14:
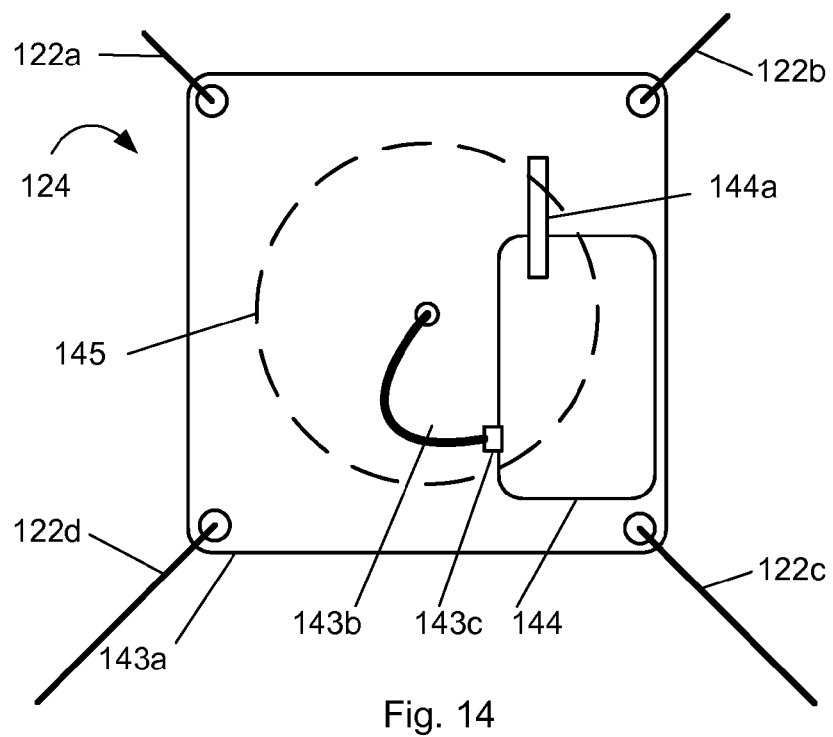
FIG. 14 is a top view of an aerial mobile RFID reader according to one embodiment of the present invention.

Referring now to FIG. 14 a top view of RFID reader 124 is shown with antenna ground plane 145 on the bottom side as depicted by the dotted lines in mounting plate 143*a* having cable attachment points at each of the four corners for suspension cables 122*a,b,c,d*. Coax cable 143*b* mates with RFID to Wi-Fi bridge 144 through connector 143*c*. Antenna 144*a* provides signal gain for the wireless connection from RFID to Wi-Fi bridge 144 to access point 126 in FIG. 33.

In preferred embodiments that use propellers 152*b* and 153*b* and a length of cable 154 RFID to Wi-Fi bridge 144 is collocated with antenna ground plane 145 and part of the antenna 150 structure that "flies" under mounting plate 143*a*. Considerations are mass, cable flexibility, and preferred RFID scan angles. This preferred embodiment offers a higher degree of X, Y, Z, rho, theta, phi freedom of motion of antenna 150.

Figure 33:
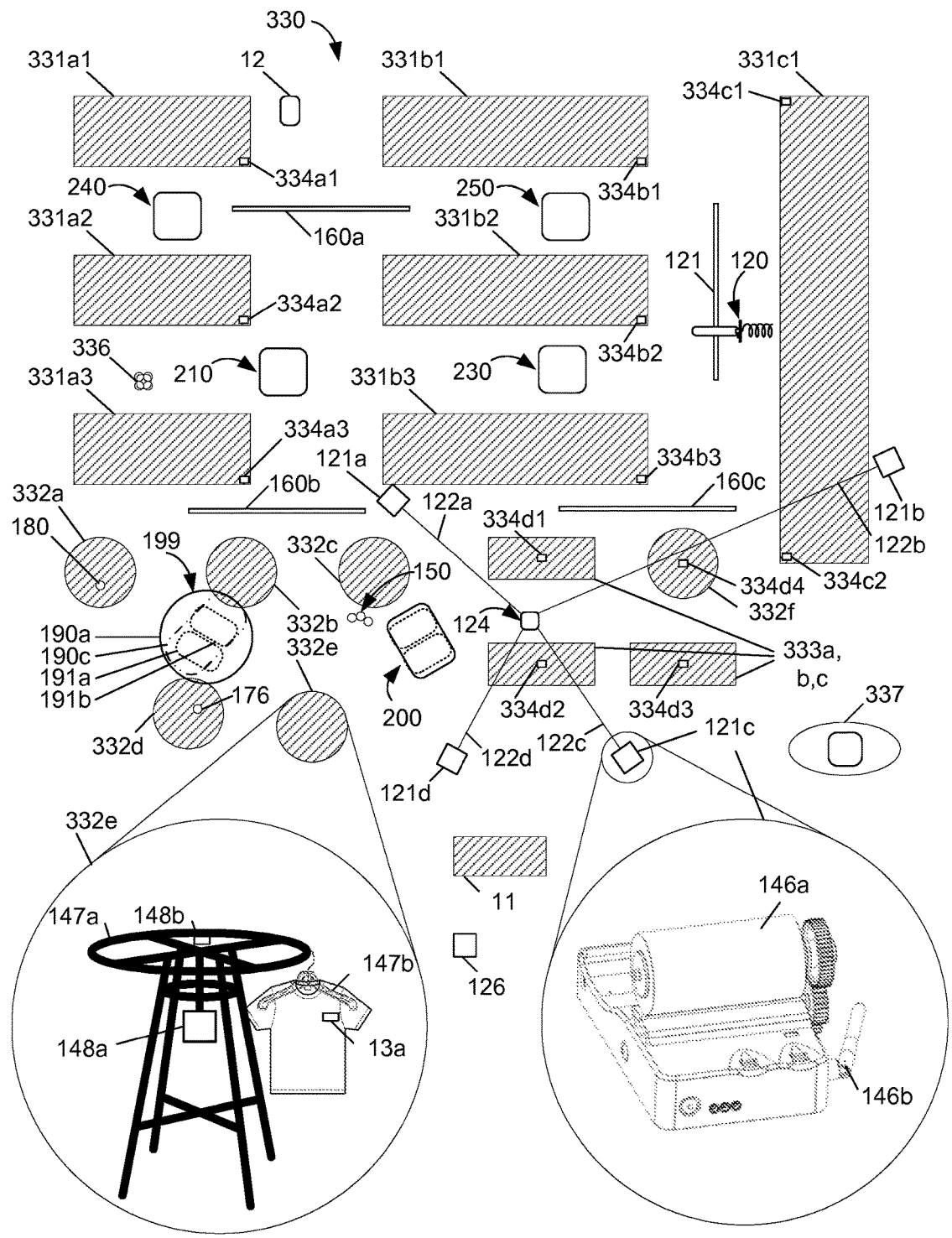
FIG. 33 is a composite drawing of the preferred embodiments of the present invention shown in a typical retail store.

In another preferred embodiment for reading RFID tags in an office, warehouse, or retail space is to use an unmanned aerial vehicle (UAV) 336 of FIG. 33 such as an indoor helicopter to achieve complete X, Y, Z, rho, theta, phi freedom of aerial mobility. There are several amateur UAV designs that are used by radio controlled hobbyists including quadracopters, tri-copters, hexacopters, helicopters, and many others that are preferably adapted to carrying an RFID reader for interrogation of RFID transponders. Another embodiment is blimp or balloon 337 of FIG. 33 to transport an RFID reader and wireless telemetry such as RFID to Wi-Fi bridge 144. Preferred embodiments use an autopilot with position sensors, gyros, and accelerometers to stabilize and control the flight of RFID-reading UAV 336 or blimp 337 through scans of tagged inventory.

Figure 17:
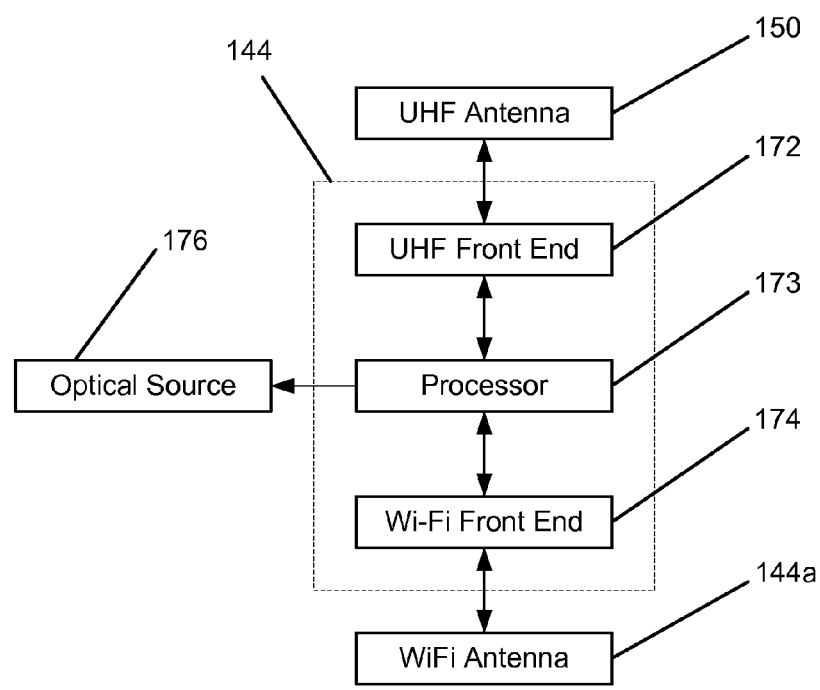
FIG. 17 is a system block diagram of a Wi-Fi bridge.

UHF Front End 172 of FIG. 17 is preferably comprised of AS3992 or AS3993 UHF RFID Reader IC from austriamicrosystems AG. The AS3992 or AS3393 preferably has a circulator directional unit connected to Antenna 150 and the RFOUT and mixer pins of the device. Other preferred embodiments use the PR9000 from Phychips of Korea.

Wi-Fi Front End 174 is preferably comprised of an IEEE802.11 baseband processor MAC and an RF transceiver and a directional unit to separate transmit from receive signal paths to Wi-Fi Antenna 144*a*. B&B Electronics is an example of one company that combines such devices with an application processor to produce Wi-Fi serial bridges. In this preferred embodiment, the application processor would also host the UHF RFID reader functions described for Processor 173 below.

Processor 173 preferably balances computational power and energy consumption to provide an efficient low power device for execution of bridging functions between UHF Front End 172 and Wi-Fi Front End 174.

Preferred embodiments also utilize low power modes of operation to reduce power consumption when there is nothing moving. The transponders in the field of Antenna 171 preferably remain in the space covered by that antenna until someone or something moves them. Once motion is detected, UHF Front End 172, Wi-Fi Front End 174 and Processor 173 preferably all wake from lower power states into an operational state to read RFID transponders, filter the list, and report final results through the wireless link to remote servers or attached clients through Wi-Fi Antenna 175 to access point 126.

In another preferred embodiment, Optical Source 176 and an antenna element such as ground plane 145 of antenna 150 in FIG. 15 are combined to form a radio wave emitting optical luminary. Additional preferred embodiments include an optical lens or set of lenses to focus light emitted from Optical Source 176 onto tagged objects at a distance that is roughly matched to the 3 dB beam width of the radio field that is formed by the antenna, such as helical 151 and ground plane 145. The matching of optical and radio coverage is preferred when the RFID reader is located at some distance from where tagged objects will be illuminated, handled, and monitored. An exemplary use case is for overhead lighting in a retail store where incandescent lamps are replaced with LED or CFL lamps that are combined with an RFID reader and high gain antenna according to the present invention.

Parabolic Aluminized Reflector (PAR) lamps is commonly used for illumination in residential, commercial, and retail recessed lighting ceiling cans. Adapting the PAR30, PAR36, and PAR38 lamp cans for a UHF RFID reading luminary is a preferred embodiment of the present invention. The PAR30 bell diameter measures 3.75", the PAR36 4.5", and the PAR38 4.75". These diameters closely match the diameter of a helical, bifilar helical, quadrafilar helical, or an octahelix antenna making the match of axial mode helical antenna to a luminary good in terms of aesthetics and functionality.

For example a 915 MHz helical antenna with a preferred circumference equal to the wavelength would have a helical winding diameter of 4.1". Adjustment of the diameter to fit the desired PAR lamp size is well within acceptable performance limits of a helical antenna. The PAR38 diameter of 4.75" would have a circumference to wavelength ratio of 1.15, and at 8 turns, a reflector to wavelength ratio of 0.8, and a winding pitch to wavelength ratio of 0.22, the resulting gain would be 20 dBic, half-power beam width of 34 degrees, a 10.3" reflector diameter, and an overall helical coil length of 26". Such a design would be suitable for high ceilings in office and retail spaces even with a power amplifier of 16 dBm or less. Such output ratings, up to 20 dBm are available from the austriamicrosystems AS3992. Preferred embodiments for less visibility of the reflector can be coated metal or comprised of a metal mesh. An endfire helical antenna with a diameter that flares out along the axial length would provide a wider bandwidth and another aesthetic aspect for the design.

For buildings that have fluorescent tubes, the replacement of those tubes with an RFID reading fluorescent or LED tube requires a broadside helical operating in normal mode. By wrapping a helical array around the tube, a field pattern is created which illuminates the space below it with light and a UHF field. These and the following embodiments all preferably derive operating power from conventional AC power mains.

Preferred embodiments do not operate RFID to Wi-Fi bridge 144 at full power and duty cycle on a continuous basis. Movement of people, their hands, or items that they are holding is preferably detected by the lamp in a low power mode whereby fluctuations in reflected light, including infrared light are detected, or changes in reflected UHF signals are detected that are indicative of such movements that would warrant full power operation of RFID to Wi-Fi bridge 144. Limiting the use of these radios helps to reduce the background noise level that other radios must contend with during their operation, therefore reducing the amount of modulated UHF or Wi-Fi signals contributes not only to an environment that is more RF friendly, but also reduces human exposure to radio frequencies. Preferred embodiments restore RFID reading within tens of milliseconds after motion is detected whereby increasing the probability of completing an inventory before the transponder population has changed.

Indoor and Outdoor Navigation

GPS signals are preferably used for guiding robots while reading inventory such as cars in outdoor automobile lots. GPS is also preferably used for geo-fencing to prevent a functioning robot from being stolen from outdoor locations. Upon detecting removal beyond predefined geographic boundaries, the robot would preferably call for help and activate protective countermeasures.

Figure 18:
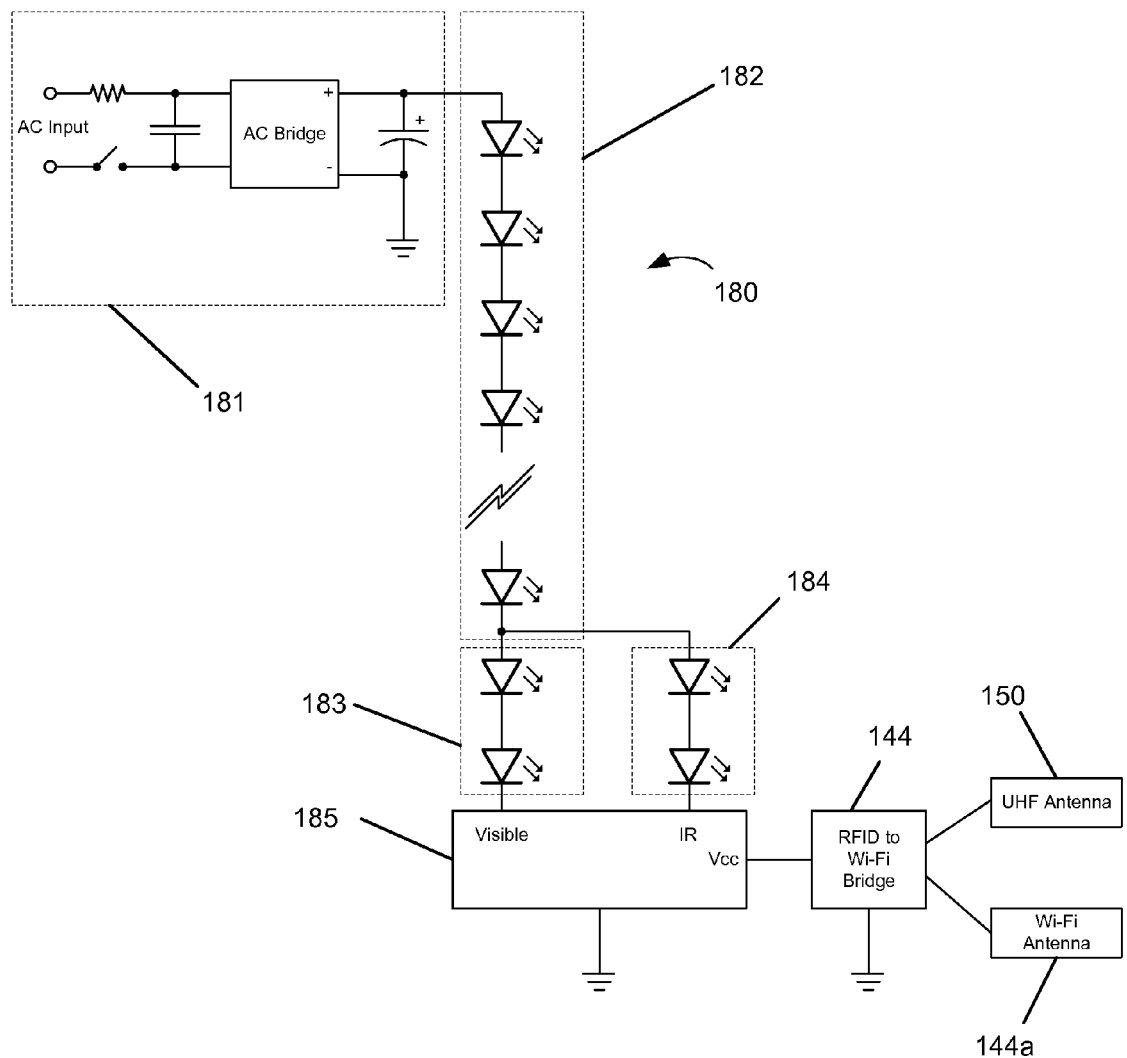
FIG. 18 is a schematic diagram of an RFID to Wi-Fi bridge with an optical source according to one embodiment of the present invention.

There are many indoor locations where GPS signal strengths are too low for indoor GPS guidance. This section teaches solutions to that problem. Referring now to FIG. 18 is a schematic diagram of a luminary with visible and infrared LEDs arranged in series with a voltage regulator for powering RFID to Wi-Fi Bridge 144. In a preferred embodiment, a series of 34 LEDs are arranged in series through visible array 182 and either visible array 183 or infrared array 184. The number of LED's in visible array 182 can vary from zero to approximately 32 for a 120 volt AC mains power through converter 181. Duty cycle and LED counts in arrays 184 and 183 determine the modulation depth of visible light and the amount of infrared light when alternately modulated by modulation switch 185. The modulation rate should not exceed half of the frame rate of camera 111 on consumer device 12 or camera 198 on tablet 197. Modulated light is preferably detected and tracked using one or more cameras within smart phone consumer device 12 of FIGS. 10 and 11 or camera 198 of tablet 197. In preferred embodiments consumer device 12 is an Apple iPhone with front and rear facing autofocus cameras. When device 12 is held in a preferred position such as a comfortable orientation for viewing the screen or alternatively placing device 12 against the side of one's ear, one or more camera are used to sense and locate light arrays 182-184.

In a preferred embodiment, the modulation of arrays 183-184 is used by devices 12 and 198 to determine the optical reference designator for light source 180 within a detection zone. The modulated LEDs having modulation patterns for signaling coded designator numbers for the optical location references. A detection zone may be one of many that are within a retail store, office building, or shopping mall. The modulation of arrays 183-184 preferably uses variations in amplitude and timing to encode the designator number for light source 180. In a preferred embodiment for the designator codes, binary encoding is used with amplitude modulation having 8-32 bit times. Other preferred embodiments use 3-8 lighting intensity levels instead of 2 levels for increased information density within a given period of time. Preferred embodiments use a modulation technique that results in a sufficiently unique number with a geographic are of a store, mall, or office such that the time that is required to complete the modulation is short compared with the amount of relative movement between device 12 and source 180 during the time that the number is being modulated. The modulation speed is constrained by the camera frame rate that preferably samples the image field at the Nyquist rate or faster. So if the frame rate is 30 frames per second, the modulation is preferably slower than 15 symbols per second. If each light source 180 is modulated asynchronously with other light sources 180, then there is preferably a synchronization pulse and data pulses. Data pulses preferably include the designator number and error detection and/or correction data symbols. In preferred embodiments the entire identification sequence is completed in less than 0.5 seconds or less.

Mobile devices consumer device 12 and tablet 197 preferably use internal accelerometers and gyros to detect its pitch, roll, and yaw relative to X, Y, and Z planes to determine the pointing angle of the camera. Using that information, only the best sources 180 are used as points of reference in terms of signal quality, which is determined by the observed intensity, separation from other light sources, signal to noise ratio, and other factors. For example, sources 180 nearer to the horizon may be ignored, even if they are within the field of view of a camera in the mobile devices. Sources 180 that are directly above or nearly so, offer high signal quality and accuracy for indoor navigation.

Using calculations like nautical navigation by the stars is preferably used with camera 111 or 198 for determining the location of the mobile device relative to the location references. Optical location references 160 or 180 are preferably within camera 111 or 198's field of view and are used like stars, the location references of which are received through the optical modulation.

The location references further comprise locations within a constellation map that is communicated to the mobile device. In a preferred embodiment, the three dimensional location of each location reference are compiled to create a constellation map. The constellation map is preferably communicated to each mobile device 12 or 197 through WiFi. In a preferred embodiment, the constellation map of location references is transmitted using either TCP or UDP packets. Using UDP packet, the constellation maps are broadcast such that each mobile device in the vicinity can use an internal dictionary or database to lookup the location of each location reference by its designator number.

In another preferred embodiment, source 180 modulates in synchronization with other sources 180. A preferred system synchronization reference is provided using a WiFi message such as a UDP broadcast at each synchronization point. For example once every second, preferably with compensation for timing delays through the WiFi stacks. Having that information available to each point that is observing light color and or pulses at various times helps to determine which source 180 is being observed with a camera's field of view as is described in further detail below.

In other preferred embodiments, sources 180 are replaced with moving parts that direct a beam or a strip of light in a preferred manner. In certain preferred embodiments, the light source is s laser that is moved using micro-machines and small mirrors in a controller manner.

In other preferred embodiments for retail stores having overhead lighting, including fluorescent or incandescent lighting emit sufficient energy in the form of light, electrostatic fields, or heat that can be harvested to power an optical reference.

In another preferred embodiment, conventional fluorescent tubes are replaced with LED arrays with optical location references built in. LED arrays are commercially available in standard sizes and lengths and do not require a ballast. In the preferred embodiment, a segment of the white LEDs is modulated from time to time at a rate that is slower than the frame rate of camera 111, preferably at about 12 Hz. By using various colors and patterns, coding schemes are possible to encode data such as a different identifier for each LED array. Using data and synchronization pulses sent through the power feeds, the LED tubes can be controlled and updated. By using sufficiently large device numbers, LED tubes can be numbered when manufactured.

Uniquely identified LED tubes offer the dual benefit of more efficient lighting than fluorescent tubes and the opportunity for indoor navigation for smart phones, tablets, and other mobile devices. Camera 111 preferably resolves the LEDs that are switched on or off and using graphics processing in the consumer device 12, calculates relative distances between LEDs that are on or off. The distance to the optical location references are computed using the pixel distance between parts of the optical location reference pattern. The parts of the optical location reference pattern is further comprised of two outer symbols that maintain a known number of LED spaces between them as a spatial reference.

Using accelerometers in each of three planes, the pointing angle of camera 111 or camera 198 of tablet 197 is computed for the mobile device enabling navigations using the encoded sections of each LED tube as a known point in space to reference from. Using at least three such points enables consumer device 12 or robot 120, 150, 199, 200, 210, 230, 240, or 250 to accurately compute its in-store location. Ultrasonic sonar modules 245a-d preferably prevent the robot from colliding with either moving or stationary obstacles by emitting an acoustic pulse and measuring the echo magnitudes and delay times to determine the distance to nearby objects.

Cameras 111 and 197 are also preferably used with tracking the centroid of optical references, optical flow, and vanishing point navigation to recognize and guide a path for robots or shoppers through aisles. Optical flow is the pattern of apparent motion of objects, surfaces, and edges in a retail store caused by the motion of camera 111 or 197. Vanishing point navigation uses the parallel lines of store aisle, shelves, windows, and overhead lighting rails to compute a distant target, such as the end of an aisle; it also provides visual angular alignment for squaring the robot for accurate triangulations and transponder location measurements.

Beams and optical patterns of various types are dispersed through the surrounding space in order to provide an optical point of reference. In some embodiments dispersion is achieved using motion, moving mirrors, and/or other optical elements. In other embodiments, dispersion is achieved using fixed optical elements. In a preferred embodiment color is used to encode angular position relative to a reference angle in any combination of X, Y, or Z planes. A prism or diffraction grating is used in one embodiment to diffract a white light source such as a white LED into red, orange, yellow, green, blue, indigo, and violet. Cameras in mobile devices 12 and 198 preferably use the color encoded information to locate themselves relative to source 180 and an angular reference.

Figure 16:
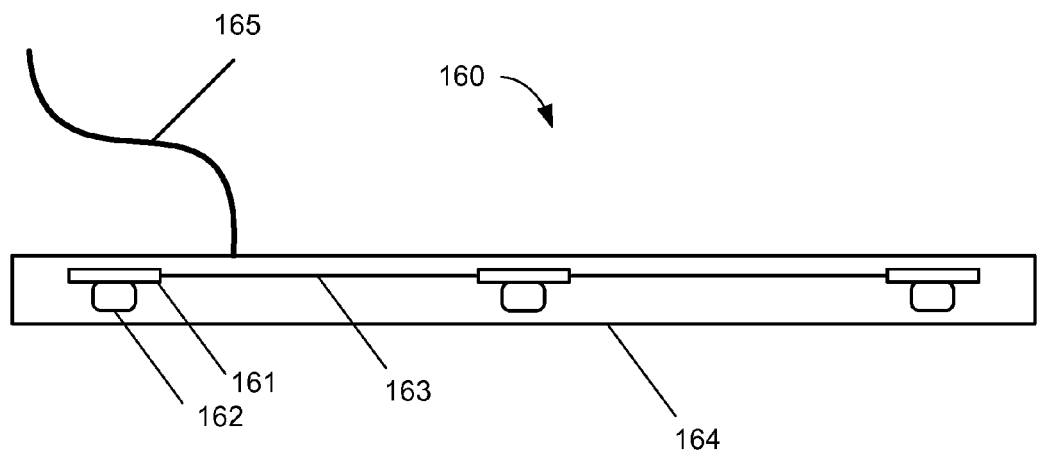
FIG. 16 is an overhead optical location reference strip according to one embodiment of the present invention.

FIG. 16 is an overhead optical location reference strip 160 comprising a linear array of LED 162 mounted to modulation device 161, connected by wiring 163, and contained with structure 164. In a preferred embodiment, structure 164 is part of overhead track 121. Cable 165 preferably provides power and control. Each modulator device 161 preferably flashes its corresponding LED 162 in a manner that enables camera 111 on mobile devices 12 and 197 to compare from frame to frame the changes in intensity such that information is decoded. The information is preferably a reference number to that LED 162 or coded location coordinates within a constellation map. Various modulation depths and binary or multi-level intensity encoding can be used to transmit the data.

Sales Floor Mobile Automated Inventory Reading

Figure 19:
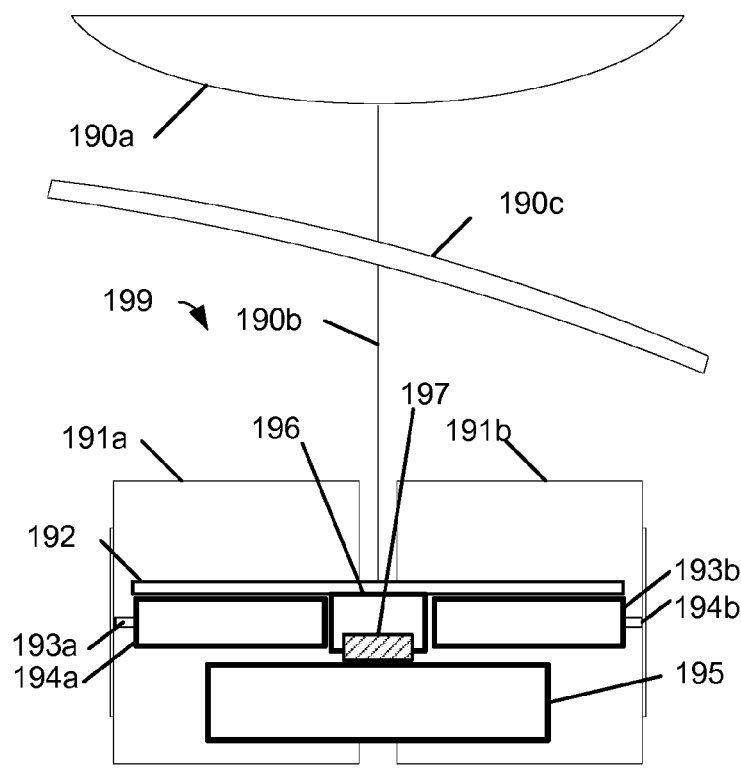
FIG. 19 is a front view of an RFID transponder-reading robot according to one embodiment of the present invention.

FIG. 19 is the first of several figures that teach automated two-wheeled mobile devices having moving parts to precisely direct an RFID interrogation field to selected vectors that as an aggregate prevent missing any transponders from among a plurality of transponders that prior art readers would miss by either lack of illumination or blinding reflections from the interrogation field. Preferred embodiments use narrow RF interrogation beams, formed by high gain antennae that greatly reduce the magnitude of reflections from off-axis signal vectors that prior art solutions typically receive and process from a plurality of responsive transponders, resulting in ambiguity of the transponders' actual locations; an ambiguity that greatly confounds tag location efforts.

Robot 199 reads the identity and actual locations of RFID-tagged merchandise. Robot 199 as shown in FIG. 19 determines the locations of tagged goods in retail stores. In this preferred embodiment, there are two wheels 191a and 191b that independently rotate in either a clockwise or counter-clockwise direction to create forward or reverse motions of robot 199, or in opposing directions for a route turn or rotation of robot 199 about a fixed point on the floor.

In this preferred embodiment, a helium-filled metallic balloon 190a is tethered to robot 199 at a point midway between the wheels 191a and 191b such that it floats over robot 199 providing a reflective surface to redirect radio waves around obstacles to and from a plurality of transponders. In preferred embodiments, a metallic coating on balloon 190a reflects radio waves from and back to antenna 192. Preferred 0.5 um thick metallization coatings are comprised of aluminum that is preferably grown using a vapor deposition process wherein the metal is heated and evaporated in a vacuum. The metal preferably condenses on a cold polymer film. In any case, metallization of balloon 190a is preferably comprised of one of: PET film, metalized PET, or aluminum foil.

Reflectivity of radio waves from the aluminum skin of a balloon was first investigated by NASA and reported in Technical Note D-115 dated October 1959. George P. Wood and Arlen F. Carter of the Langley Research Center deduce from Maxwell's equations, assuming a sufficiently large wavelength and surface conductivity that the reflectivity of a balloon coated with a 2200 Angstrom aluminum skin is:

$$R = 1 - 2/\mathrm{SQRT}(mu * \mathrm{sigma} * \mathrm{lambda} * c)$$

Where: mu=permittivity of free space=$4*pi*10^{-7}$ volt-sec/amp-meter, sigma=conductivity of aluminum skin=$4*10^6$ mho/meter, lambda=wavelength of radio wave=c/f, and c=speed of light=$3*10^8$ m/sec. The resulting reflectivity R for a range of frequencies between 500 MHz and 2400 MHz is from 99.993% to 99.985%. So therefore, a metalized balloon, having a 2200 to 5000 Angstroms thick aluminum skin will reflect nearly all of the energy that it is directed to its surface by antenna 192.

Further applying the research of Woods and Carter to the calculation of signal loss on a path to the metalized balloon, we implement the following equation:

$$P_R/P_T = G_A * R * \mathrm{Pi}^2/4 * D_b^2 * \mathrm{Lambda}^2/(4*pi)/(16*pi^2*L^4)$$

Where: $P_R$=power received, $P_T$=power transmitted, $G_A$=Gain of antenna, R=Reflectivity of metalized balloon, $D_b$=Diameter of metalized balloon, Lambda=wavelength of RFID interrogation signal, L=Path length from antenna to balloon.

The resulting path loss ranges from −12 to −45 dB for a 915 MHz signal that is transmitted and received by an 8 dBi circularly polarized antenna that is aimed into a 0.5 meter diameter metalized balloon with a 0.99991 reflectivity on a tether that is varied from 0.3 to 2.0 meters long.

The path loss is preferably reduced by using a non-spherical balloon shape with a bottom convex surface that has a radius that is much larger than the radius of a spherical balloon with an equal volume. In the above formula $D_b^2$ would increase by a factor of 100 for a balloon with an apparent radius on the bottom surface that is ten times larger than the equivalent spherical balloon. This can result in a 20 dB improvement in path loss for the reflected signals. This is because of the additional energy reaching a population of transponders and returning much stronger backscattered signals from them to antenna 192.

The reflected 860 to 960 MHz radio waves from balloon bottom surface 190*a* arrive at RFID transponders in retail stores from angles with a significant horizontal component compared to a direct line of propagation from antenna 192 that originates more nearly at floor level compared to the balloon surface 190*a* or a reflector 190*c*.

Using a motor to drive a winch, the length of tether 190*b* can be varied to provide a range of angles of incidence onto a plurality of RFID transponders. This overcomes a significant problem in retail stores where shelving, fixtures, and merchandise reflect or absorb RFID interrogation signals. Using robot 199 to read RFID transponders in a methodical manner is an improvement over prior art where store employees do not always provide a consistent reading of store inventory. Reflective surfaces of balloon 190*a* or reflector 190*c* redirects interrogation signals from antenna 192 such that materials such as shelving and radio absorbent clothing are bypassed so that there is sufficient power reaching transponders and returning along the same signal path to RFID reader 196 with sufficient amplitudes that otherwise unread transponders are read.

Reflector 190*c* is a reflective surface that is used in certain preferred embodiments. Under FCC rules a passive reflector is considered as part of the antenna assembly of the Part 15 transmitter. At sufficient distances, the passive reflector is allowed so long as it does not increase the overall antenna gain and serves the primary purpose of overcoming RF absorbing obstacles and retro-reflective carrier reflection paths that could saturate the reader's baseband amplifiers. Accordingly, reflector 190*c* and antenna 192 preferably together form an offset-feed parabolic antenna, the shape of which is an asymmetrical segment of a paraboloid or a near paraboloid shape. Since the gain of a 0.5 meter diameter parabolic antenna for 915 MHz is 11.6 dBi, it is necessary to reduce the transmitter output power in order to comply with FCC regulations. In this preferred embodiment, gain primarily varies with the pointing angle of antenna 192 and as the length of tether 190*b* changes, resulting in a controlled change in parabolic focal length. For any length of tether 190*b* that is not equivalent to the focal length, there is an error. Each variation on the order of 8.2 cm, is one quarter of a wavelength and causes a reduction of about 1 dB in antenna gain. Therefore, in order to comply with FCC regulations, certain pre-programmed tether lengths are preferably used to ensure that gain limits for the combined antenna assembly do not exceed part 15 limits. The pointing angle of antenna 192 is controlled using motors 194*a,b* as angles are sensed by the accelerometers of controller 197.

Battery 195 is mounted below axles 193*a* and 193*b* to provide a low center of gravity, the result is inherent stability, unlike that of a classic inverted pendulum robot. A natural tendency on a flat hard floor is therefore that antenna 192 will be oriented with a major lobe of RF power in a generally upward-facing direction.

As robot 199 traverses a retail sales floor or inventory storage areas, it may from time to time encounter obstacles in an otherwise flat surface. Encountering such obstacles can result in antenna 192 suddenly tilting. Robot 199 is preferably comprised of accelerometers and a three-axis gyroscope that detects changes in position and angular orientation. Controller, tablet, or iPad 197 from manufacturers such as Motorola or Samsung preferably detects and responds to changes in orientation under the control of algorithms that take into account the duration of the disturbance and historically related information. Controller 197 preferably learns by recording previous encounters with obstacles at certain locations, and reuses successful maneuvers to escape from known obstacles.

Robot 199 is preferably comprised of proximity sensors such as sonar modules to detect obstacles and boundaries. Sonar modules preferably report range to objects that reflect acoustic waves and enable robot 199 to stop or to take evasive action. Escape maneuvers of robot 199 preferably include reversing, pivoting, and changing direction to go around obstacles such as walls, furniture, and movable objects.

Controller 197 preferably communicates with RFID reader 196 using a wired or wireless connection such as those defined by Apple for iPhone/iPod/iPad accessories. Information from RFID reader 196 is preferably collected and stored using techniques that are described above, including H-Files. In a preferred embodiment, SGTINs are associated with location information which in some cases is provided by reading RFID transponders that are encoded with location codes.

Transponder location information preferably references a system or references points that extend beyond the boundaries of the room or space in which robot 199 is operating. A plurality of transponders can therefore have a distance between them that is greater than the physical dimensions of the space that they are contained within. For example, in a preferred embodiment, RFID location transponders are encoded with high resolution longitude and latitude information. A preferred location identifier for an RFID transponder uses GPS coordinates. Such a location system is preferably used to track the locations of goods on a global scale.

A database preferably collects transponder identities and locations from robot 199 and others like it in retail facilities around the world. The robots periodically upload data to the database as WiFi, 3G, or 4G wireless services are available.

The database preferably comprises means to report the locations of associated transponders to consumer devices wherein the associations are defined by characteristics of the objects that the transponders are attached to. The associations preferably comprise characteristics that include and are defined by fashion, style, or personal preferences. The database preferably accounts for fashion and style changes and alters the associations so that consumers will be more likely result to buy.

The database preferably responds to queries from consumer device 12 such as "where is there a top that goes with these pants at a price under $40?". Such queries are preferably submitted using a voice command feature such as Apple's Siri.

Figure 20:
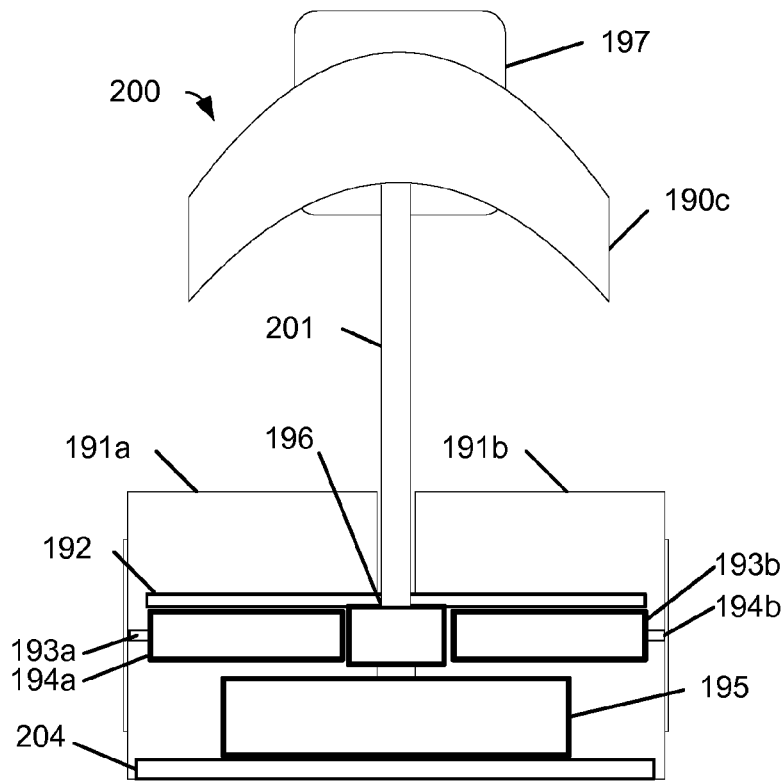
FIG. 20 is a front view of an RFID transponder-reading robot with a computer touch screen according to one embodiment of the present invention.

Referring to FIG. 20 is a robot that reads RFID transponders using a planar high gain antenna such as a quad patch array 192 that is used as a feed into reflector 190c which is preferably parabolic to narrow the beam and create gain for interrogator 196. In this and other embodiments the narrow beam improves transponder location accuracy by reducing off-axis reads and reflections that confound tag location efforts. When an aggregate number of such reads are post-processed using triangulation, then the resulting tag location accuracy is greatly improved over prior art systems, methods, and devices.

Two-wheeled embodiments of robot 200 preferably have a center of gravity that provides a balance between two important functions: tilting antenna 192 and making movement along a travel path. A center of gravity that is too low will reliably hold mast 201 and tablet 197 in an upright orientation, but will be very difficult to induce into tilted orientations without also inducing oscillation of mast 201 or forward and reverse path motion. Conversely, a center of gravity that is too close to the axis of rotation of wheels 191a,b will be very easy to tilt but may encounter obstacles such as carpet edging that are difficult to pass over without inducing extreme antenna tilting.

Addressing the aforementioned center of gravity challenge, chock 204 is used in certain embodiments to add stability. Chocks like chock 204 on either side of a radiolucent version of wheels 191a and 191b prevent rolling for low center of gravity embodiments, whereby allowing the torque being delivered by motors 194a and 194b through shafts 193a and 193b respectively to wheels 191a and 191b that is used to correct for deviation of robot 200 off of a vertical axis.

Referring now to FIG. 21 is a side view of robot 210 that reads RFID transponders using helical antenna 211. With a boom length of 1.065 m (41.9"), diameter of 104.3 mm (4.1"), reflector diameter of 327.7 mm (12.9"), 13 turns, and a turn to pitch ratio of 0.25, the resulting gain is 23.59 dBic. Battery 195 is preferably either a lithium battery or a lead acid battery with significant weight to counter balance the weight of Apple iPad 197 with a weight of 1.46 pounds. iPad 197 is held upright by this counterbalance design, as well as through the use of accelerometers such as the ADXL346 from Analog Devices, and a 3-axis MEMS gyroscope such as L3GD20 from ST Micro that together sense movement changes in X, Y, Z, pitch, roll, and yaw and provide correctional commands to motor 231a,b drives to control tilt and movement.

In preferred embodiments motors 231a,b are polyphase brushless DC (BLDC) motors. Motor 231a and 231b are preferably three-phase BLDC motors with Hall effect sensors or back EMF sensing to sense the angular velocity and position of the rotor. Motors 231a,b are preferably each comprised of a 100 to 500 watt hub motor measuring about 5 to 9 inches in diameter that benefit from mass production for e-bikes which have recently become globally popular, whereby driving costs down. Preferred robot embodiments using BLDC hub motors 231a,b are an improvement over prior art robots by reducing heavy and expensive gear train parts that prior art robots use to deliver sufficient torque to tilt, roll, and climb in retail store and warehouse environments. Preferred embodiments of robots 199, 200, 210, 230, 240, and 250 using motors 231a,b have sufficient torque and traction to climb ramps and stairs in order to successfully scan all parts of multi-level retail environments. Due to the lack of brushes, BLDC motors 231a,b will not spark, making them better suited for use in environments where there are volatile chemicals or fuels.

Micro-stepping of BLDC motors 231a,b using sine-cosine phasing is used in preferred embodiments. Micro-stepping motor drives preferably include a torque feedback loop that controls the current through an H-bridge on each phase using phase current modulation such as pulse width modulation (PWM) to switch phase current on and off in a controlled manner, allowing freewheel current to circulate through a freewheeling diode for each phase as the magnetic flux gradually subsides in a current waveform that resembles a saw tooth. Preferred embodiments use coreless motors with Litz wire coil windings to reduce eddy current losses and wheel weight. Current and therefore torque delivered to motors 231a,b or motors 194a,b is preferably controlled by a proportional-integral-derivative (PID) control loop for antenna tilt, holding a stable position or posture, or for ascending or descending ramps, unlevel floors, or stairs. PID control loops preferably use accelerometers and gyros to sense and control to certain positions or postures while moving or standing in one place. Torque and speed control are independently controlled for motors 231a,b or 194a,b to move, tilt, or rotate the robot around its central vertical axis or for an active differential for smooth turns about a desired turn radius.

Hub motor 231a, preferably comprising a central axle is coupled to wheel 191a with a disc or spokes to a rim for holding a tire or other traction surface. The same is preferably true for motor 231b and wheel 191b such that robot 210, 230, 240, or 250 preferably comprises two wheel hub motors. The disc or spokes preferably provide an axle height above the floor that enables sufficient clearance for counterbalancing mass and weight to be placed below the axle whereby moving the center of gravity for the entire robot 199, 200, 210, 230, 240, or 250 below the axles. In preferred robot embodiments battery 195 comprises a significant part of that counterbalancing mass and weight. Lead acid, LiNiMnCo, LiFePO4, lithium phosphate, or lithium-ion batteries deliver up to 50 amps to wheel hub motors in preferred embodiments of battery 195.

Reflector 190c is preferably parabolic and is rotated through various angles to redirect the elevation angle of the primary lobe from antenna 211 along central axis 214b that results from incident wave front that is aligned along central axis 214a. Bottom reflector 211a is shown to scale, providing the end-fire functionality of helical antenna 211. Reflector 190c is preferably rotated through various operating angles with a servo-controlled motor. In other preferred embodiments, shape memory wire is used by running a current through it to alter the length of the wire, whereby moving a low mass reflector 190c through a range of scanning angles. In other preferred embodiments a rotating polygon is used to steer beam 214b through a range of elevation angles. Wheels 191a and 191b are counter rotated to sweep beam 214b through azimuth angles.

In preferred embodiments, reflector 190c is a metalized inner surface of an inflatable radiolucent skin. The inflatable radiolucent skin (IRS) preferably has metalized reflective coating selectively applied for form a radio signal reflector, which preferably forms a parabolic reflector that compensates for gain loss and maintains beam focus while redirecting it toward a plurality of RFID transponders. The IRS reflective surface comprises an inflatable radiolucent skin to define and retain a desired shape for aesthetic or safety reasons. IRS is an inverted combination of balloon 190a and reflector 190c from FIG. 19. In preferred embodiments IRS has certain humanoid features, such as arms, face, ears, nose, and other human or amusing animal body parts.

RFID reader 212 is preferably used in certain preferred embodiments for shopper 219 to read RFID transponders on items for sale. In certain embodiments, reader 212 is not needed, especially if leakage from helical 211 is sufficient for reading transponders or if the feature is not needed. Reader 212 is in the embodiment of FIG. 21, one of three RFID readers used by robot 210.

RFID reader 213 is preferably used in certain preferred embodiments to read RFID transponders that report physical locations on floor 218. Transponders reporting physical location are preferably rugged and operate well even if embedded in a concrete floor. UHF, HF, and LF transponders are all candidates; however the lower frequency transponders are generally better suited as floor location markers.

In FIG. 22 is a cutaway view of antenna 211 showing helical 221 which is held in place by the plastic tube which is shown in this embodiment as being optically clear and connected through reflector 211a to an antenna feed connector to dual port RFID reader 213 which in this preferred embodiment has a second antenna port for reading the RFID transponders that report physical locations on floor 218.

Hook 216 carries items that are on hangers and also preferably pass through the field of an on-board RFID reader such as reader 212. In preferred embodiments, hook 216 or a basket have an electronic scale for measuring the weight of goods; weight measurement is preferably used for self-checkout, loss prevention. A preferred embodiment of robot 210 determines when items have been added to or removed from basket or hook 216. Preferred embodiments of FIG. 21 have RFID reader 212 facing toward basket or hook 216 to detect and register the event when the correct weight is detected by the scale. Correct weight is stored in an item database and associated with a GTIN decoded from the SGTIN that is read from RFID reader 212.

Certain preferred embodiments of robot 210 use iPad 197 to collect payment based on the items that are in basket or hanging hook 216, or otherwise identified as being sold to shopper 219. Payment collection preferably includes the processing of a credit card or a store account. Preferred embodiments of robot 210 have credit card reader that can preferably read magnetic stripe cards, chip cards, or NFC cards and mobile phones. Certain preferred embodiments of iPad 197 or similar devices have NFC (Near Field Communications) readers for wireless transactions with chips and mobile phones like consumer device 12.

Retail store employees also preferably have robot 210 carry or contain an RFID transponder encoder for tagging store merchandise. On-board RFID readers are preferably used for verification of PPR encoded transponders and committing them to an inventory database that preferably includes the location of the tagged item.

Referring to FIG. 23 is a side view of robot 230 that illustrates a preferred arrangement of wheels 191a and 191b, size and placement of battery 195, and a view of reflector 211a and beam steering reflector 190c. The ergonomics of tablet 197 is shown at a preferred height in relation to shopper 219. In other preferred embodiments, the position of iPad 197 is preferably adjustable. The weight of battery 195 is a deterrent against theft of robot 210. Preferred embodiments of robot 210 include self-aligning recharge connections for parking robot 210 in a location where it can guide itself to recharge battery 195.

In an alternative embodiment, helical antenna 211 is replaced by a planar high gain reader and antenna. In this alternative embodiment, reader and antenna 190c directs a focused lobe of energy in a horizontal direction away from shopper 219. In certain preferred embodiments, high gain antenna 190c is a steerable phased array antenna that sweeps radio energy in elevation and azimuth having the advantage of sweeping a beam without using moving mechanical parts. This provides advantages of multiple view points of a tag population and increasing the probability of reading all tags within the target population despite some views having high levels of carrier reflection back into the receiver of the RFID reader.

The figures and descriptions for robots 120, 124, 150, 180, 199, 200, 210, 230, 240, 250, 336, and 337 teach novel solutions to the problem of providing cost effective means for accurately reading inventory counts and locations, even during the hours of regular business operations.

A helpful and interactive shopping experience can be delivered to shoppers with the likely result that they will find what they want to buy, with less time and effort, and will probably recommend the store to their friends and will probably return again for more shopping. Using camera 198 iPad 197 uses visible information from shopper 219 to display images and information about sellable items having RFID transponders attached. These robots interact with consumer devices 12 utilizing the multi-channel shopping solutions described above.

Communication between consumer device 12 and iPad 197 preferably uses a WiFi or Bluetooth connection to exchange information that informs shopper 219 and assists in the sales process. In a preferred embodiment shopper 219 using WiFi calls for assistance from a robot and robot 210 arrives at her location to provide assistance. Once robot 210 arrives, a Bluetooth connection is preferably established to offload the WiFi network and to provide a dedicated and responsive interaction between iPad 197 and consumer device 12. Interactions preferably include evaluation of selected products and suggestion to shopper 219 similar, matching, or compatible products. iPad 197 also preferably helps shopper find items of interest that are on sale, such as an end of season sale. iPad 197 also preferably helps shopper 219 select enough items of interest to reach a total sales amount that qualifies for coupon, gift card, or rebate. As part of this process iPad 197 displays the running tally of goods selected for purchase and suggests interesting items for final purchases that will fulfill the minimum purchase requirements for the retailer's incentive. A preferred result is the shopper 219 enjoys the experience and buys more goods.

To enhance the consumer smartphone experience, in a preferred embodiment, consumer device 12 has an RFID reader that eavesdrops to read RFID transponders that are illuminated by antenna 211. RFID transponders preferably remain powered while a low power reader 12d on consumer device 12 interrogates tags at a larger range that it would otherwise be able to for lack of power. In a preferred embodiment antenna 211 emits continuous wave power to the plurality of transponders, leaving short gaps of time for low power consumer devices 12 to interrogate the same transponders while the transponders are still powered. The preferred result is the ability to read the illuminated transponders at a much greater range. In another preferred embodiment, consumer device 12 and interrogator 12d eavesdrops on the interrogation process that is performed by read and antenna 211. The preferred result is a substantial improvement in range without using battery power from consumer device 12 to power the plurality of transponders.

In preferred embodiments the robot directs its antenna 211 beam toward the place where shopper 219 is reading transponders to illuminate the transponders and make the inventory more visible to consumer device 12. Robot 210 preferably receives information about where shopper is interested by one of several methods including location coordinates from consumer device 12, receiving radio signals from interrogator device 12d, visual information through camera 214, or other means. Preferred embodiments of robot 210 have multiple UHF receivers positioned to sense RF interrogation signals around its perimeter in order to identify the location of shopper 219 and illuminate transponders for the consumer device 12 of shopper 219.

In a preferred embodiment, consumer device 12 initiates a transfer of data to robot 210 that includes wish lists, saved shopping carts from online shopping, size, color, and style preferences. Robot 210 then uses that information to lead shopper 219 to goods on a retail sales floor that is likely to interest shopper 219, whereby increasing the probability of a sale. Robot 210, having physical mobility, detailed inventory location and stocking information, and the desires of shopper 219 preferably result in iPad 197 computing a sales strategy that includes touring of the sales floor with shopper 219 in tow. The touch screen of iPad 197 preferably displays information to shopper 219 that makes informed suggestions, and using audio, visual, or other cues, determines what to do next.

Figures 24, 25:
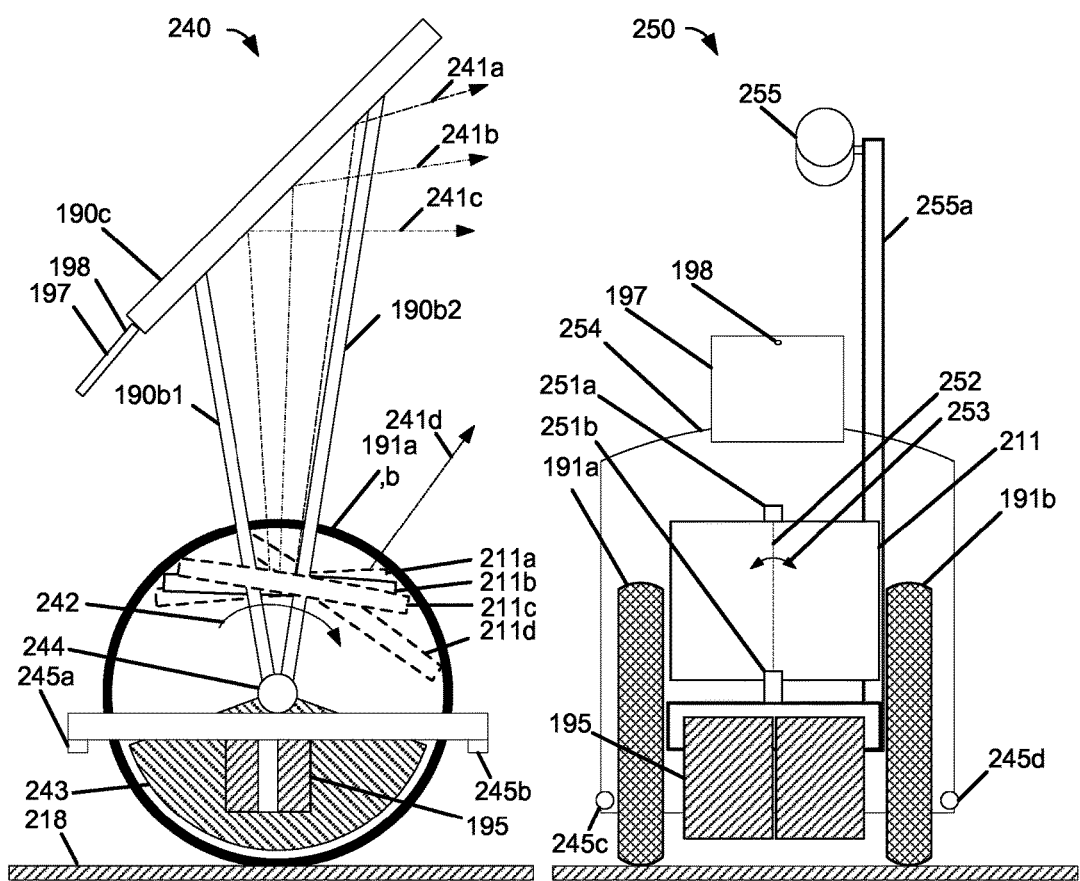
FIG. 24 is a side view diagram of an RFID transponder-reading robot with a computer touch screen and high gain RFID antenna array and optional beam reflector according to one embodiment of the present invention.
FIG. 25 is a rear view diagram of an RFID transponder-reading robot with a computer touch screen and steerable high gain RFID antenna array according to one embodiment of the present invention.

Referring now to FIG. 24 is a side view of robot 240 wherein antenna 211 is tilted at various angles including a sub-range of angles that include illumination of reflector 190c to redirect the RF signals toward a plurality of PPR transponders at various angles. The shape and posture of reflector 190c determines the redirecting angles which may be flat, divergent, or convergent depending on the embodiment. Reflector 190c is held in an upright posture by struts 190b1,2 and counterweight 243 which hangs below bearing set 244 which in other embodiments is moved fore or aft, up or down, to shift the center of gravity, preferably below axles of wheels 191a,b.

It is important for high gain antenna 211 to move through angle 242 to arrive at antenna positions 211a-d to generate multiple beam path vectors 241a-d that result in multiple read occurrences for triangulation computations to reliably determine the location of each detected transponder. Preferred embodiments use accelerometers on reflector 190c or struts 190b1,2 or a shaft encoder at bearing set 244 so that beam redirection angles can be computed and controlled. In a preferred embodiment this inherently upright reflective structure has an enclosure or an inflatable skin to attain aesthetic or safety features. Ultrasonic sonar modules 245a-d are placed to detect obstacles as described above.

Referring to robot 250 of FIG. 25, antenna 211 is free to rotate about axis 252 through angles 253 on gimbals as it is suspended by gimbal mounts 251a and 251b. Prior art of U.S. Pat. No. 7,733,230 is for a repositionable antenna which is not sufficient to achieve the item-level inventory count and location accuracy that is demanded by retailers and needed for multi-channel shopping with smart phones. The antenna must be swept in a methodical and controlled manner for triangulation computation as described above. This motion can be achieved from gimbaled antenna 211 using a dedicated beam sweep motor or by creating a pendulum affect motion that is excited by motors for wheels 191a and 191b and kept in synchronous motion at controlled amplitude by accelerometers, gyros, or shaft encoders that monitor the motion of gimbaled antenna 211. Controller, iPad, or tablet 197 is positioned out of the sweep paths of antenna 211 but within view and preferably the reach of person 219. Battery 195 is mounted below the axles of wheels 191a,b to stabilize robot 250 in an upright posture at zero torque.

Proximity sensors 245c-d, such as sonar modules are used to sense and avoid collisions with obstacles. Additional sensors are preferably on robot 250's perimeter.

Radiolucent skin 254 of robot 250 is preferably comprised of a plastic material that does not absorb or reflect radio waves in the 860 to 2600 MHz range. Skin 254 is preferably adapted to accept an advertising wrap with custom graphics for customizing robot 250 to harmonize with retail store appearance, color, style, attitude, and motif.

Figure 26:
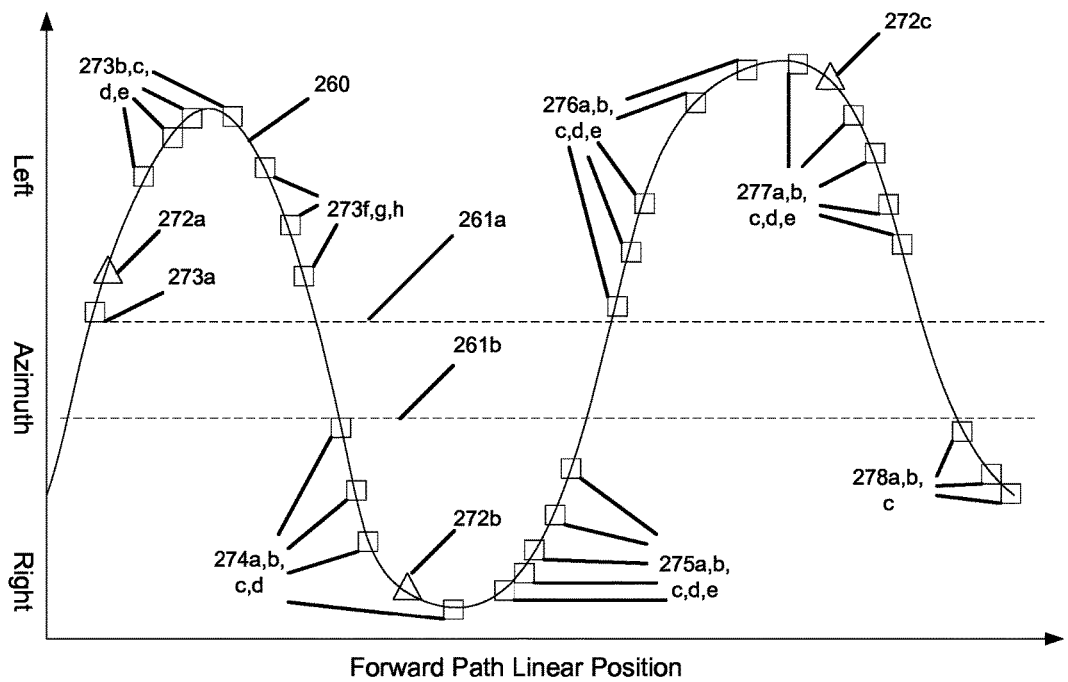
FIG. 26 is a tag discovery diagram for various azimuth angles as a robot scans at a fixed elevation angle and travels forward along a linear path according to one embodiment of the present invention.
Figure 27:
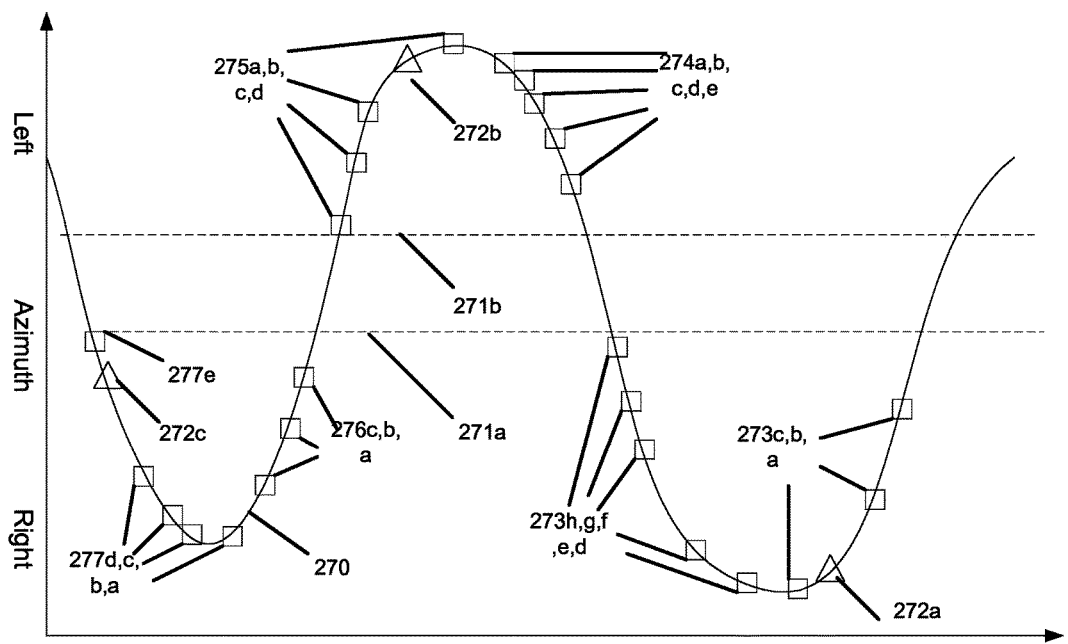
FIG. 27 is a tag discovery diagram for various azimuth angles as a robot scans at a fixed elevation angle and travels along a linear return path according to one embodiment of the present invention.

Forward and return aisle traversal of robot 250 with swept narrow beam antenna 211 preferably produce tag discovery maps as shown in FIGS. 26 and 27. Tagged items in a retail store appear at the extremes of sweep path 260 or 270, but not in the middle section between dotted lines 261a,b and 271a,b because tagged items are usually not laying in the middle of the aisles, a fact that reinforces robot path navigation. Tag 273a appears as the first tag on the left when robot 250 moves forward through the aisle, and again as the last tag on the right when returning along the aisle in the opposite direction. Location tags 272a-c appear in FIG. 26 and reappear in FIG. 27 on the return path, the displacement of their apparent locations relative to merchandise tags 273a-h, 274a-e, 275a-e, 276a-e, 277a-e are due to parallax affects between the forward and return path views. Tags 278a-c and 275e are only seen on the forward path due to an RF-blocking obstacle, reinforcing the point that prior art fails to meet today's needs.

Figure 28:
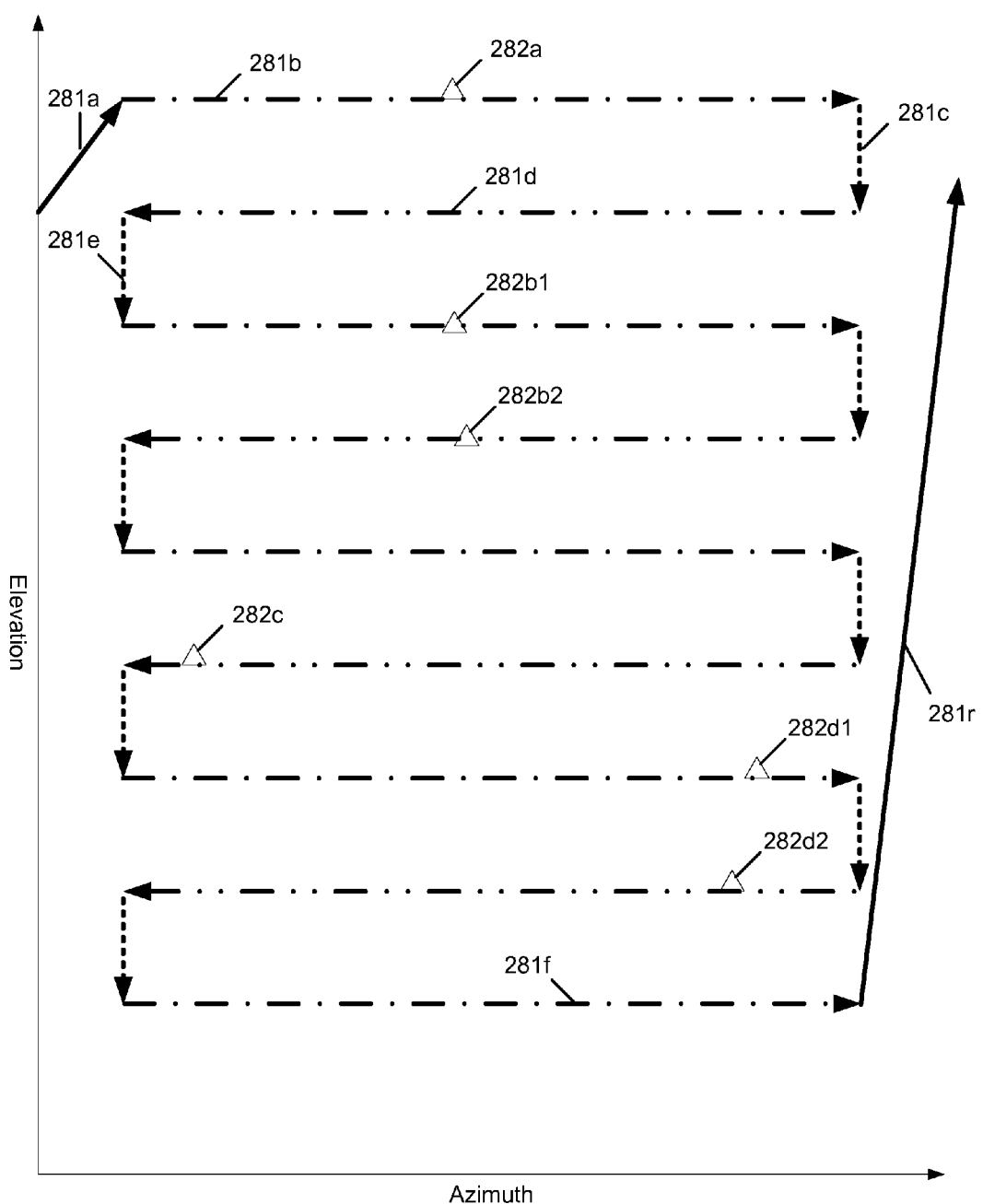
FIG. 28 is a tag discovery diagram for various azimuth and elevation angles as a robot scans from a fixed point on a sales floor according to one embodiment of the present invention.

Referring now to FIG. 28 is a tag discovery diagram for various azimuth and elevation angles as a robot 120, 150, 199, 200, 210, 230, 240, or 250 scans from a fixed point on or above a sales floor according to one embodiment of the present invention. A preferred scan begins as antenna 211 or 151 is positioned to a starting point in a rack of clothes for example by using starting move 281a. Azimuth sweep 281b encounters tag 282a before reaching its endpoint and changing elevation with move 281c to then begin return sweep 281d, and then elevation move 281e. The subsequent sweeps encounter tag read 282b1 and 282b2 of the same tag on a return sweep. Later tag reads 282c, 282d1, and 282d2 occur before final sweep 281f and robot repositioning move 281r.

Figure 29:
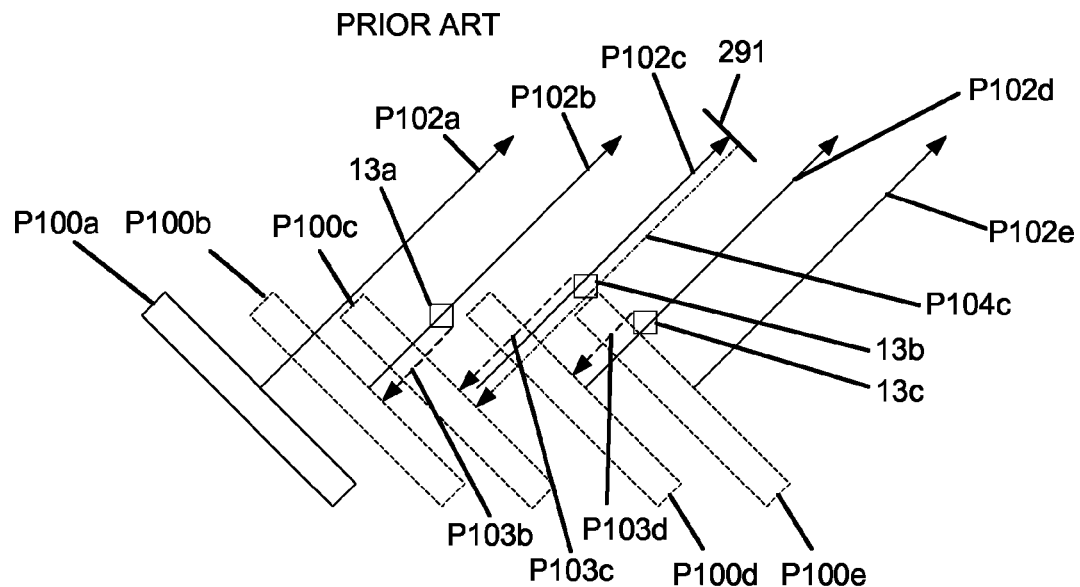
FIG. 29 is a diagram of Prior Art showing retro-reflected carrier while reading a plurality of RFID tags.

Referring to prior art in FIG. 29, inherent problems are illustrated to show how reflected carrier P102c, either modulated or un-modulated is reflected back from metal object 291 into the RFID reader's receiver. Retro-reflection path P104c to the narrow beam antenna at position P100c causes the receiver to be swamped with signal that is much greater than the back-scattered signal P103c from at least RFID transponder 13b. The result is that unless transponders 13a-c are read from a different, non-blinding angle, transponders 13b will not be recognized by the reader. Positions P100a,b, d, e are shown not to cause reflected carrier. Carriers P102a,e do not result in any tag reads. Carrier P102b results in back-scattered P103b and a successful read from transponder 13a. Carrier P102d results in back-scattered P103d and a successful read of transponder 13c, but there is in this case no successful read of transponder 13b. This problem with prior art becomes worse in warehouses and retail environments where metal racking and displays cause reflections that blind some tag reads. Prior art fails to systematically overcome this problem, failing to deliver required inventory accuracy.

Figure 30:
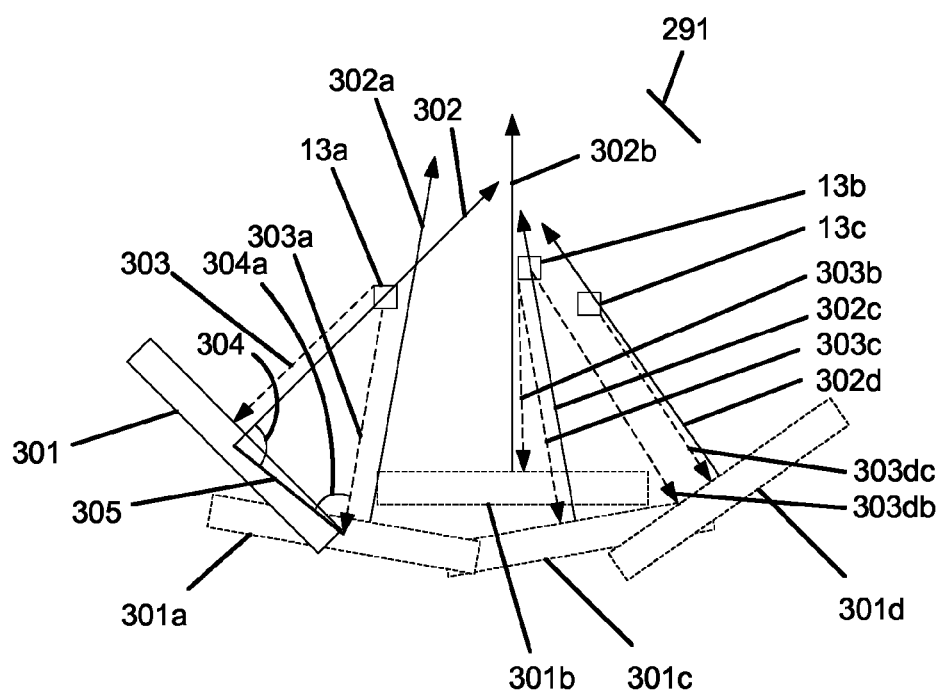
FIG. 30 is a diagram according to one embodiment of the present invention for overcoming carrier reflections to read a plurality of RFID tags.

Referring now to FIG. 30 is a diagram according to one embodiment of the present invention showing moving parts including antenna 301 on a mobile device that precisely directs an interrogation field to selected vectors that as an aggregate prevent missing any transponders from among the plurality of transponders 13a-c. The aggregate reads from selected vectors 302 and 302a-d prevent missing transponders for lack of illumination or from carrier reflections from object 291 by systematically changing the angle and position of antenna 301 through subsequent selected vectors that are normal to antenna positions 301 and 301a-d. Carrier 302d illuminates tag 13b and 13c resulting in backscattered responses 303db and 302dc respectively. Carrier 302 illuminates transponder 13a and through modulated protocol causes it to backscatter response 303 to antenna 301 and its connected RFID reader for a successful read. Similarly from position 301a carrier 302a causes response 303a from transponder 13a resulting in a second read. This second read is then preferably used to triangulate the three-dimensional location of transponder 13a using the intersection point of the vectors formed by the three-dimensional angles of carrier 302 and 302a.

Triangulation computations for computing the location of transponder 13a in FIG. 30 uses base line 305 that runs between the midpoints of antenna at the x, y, z position 301 and the x, y, z of position 301a. Angle 304 and angle 304a are the known pointing angles of the narrow beam antenna at points 301 and 301a respectively. The length of a perpendicular line from base line 305 to the location of the center of transponder 13a is computed using the law of sines as the length of line 305 times the sine of angle 304 times the sine of angle 304a, all divided by the sine of the sum of angles 304 and 304a. Then using the known locations of robot 240 at antenna positions 301 and 301a, the length of this perpendicular is then preferably converted into a store-level coordinate system such as Cartesian coordinates with an x, y, z ordered triplet of axes to record the location of transponder 13a or if the tag is a location transponder that contains coordinates, then the location of robot 240 is back-calculated and updated. Robot 240 preferably uses accelerometers and gyros to sense motion, acceleration, and posture and to help determine the robot's position and posture between location tag readings.

The above calculations are based on the use of a narrow beam, high gain antenna directed along selected vectors in order for the triangulation computations to be valid and accurate. In preferred embodiments, the antenna gain has a minimum of 11 dBic in order to form a narrow interrogation field from an RFID interrogator coupled with the antenna, for reading tags in a narrow sector of RFID-tagged inventory items at any one time. This narrowly focused beam reduces the probability that a scan will be blinded by un-modulated carrier being reflected into the receiver or for off-axis transponders to confound location by being illuminated and responsive to the carrier beam. Preferred embodiments detect amplifier saturation from blinding reflections and record the beam vector and location of blinding carrier reflections. Avoidance of or saving points of location reference are preferred uses of that stored information, enabling multi-dimensional alignment of scans from day to day.

Lacking a narrow beam antenna, prior art RFID tag reading methods fail to make proper use of the EPC-defined inventoried state of tags that enter the read field off-axis, since that off-axis distance can be large relative to the read range. Proper use for determining the location of the tags with minimal error requires that the field be swept across the transponders from more than one direction, preferably from multiple directions. Since the EPC protocol provides for inventoried tags to become silent, they will not be read again in that inventory round. In most cases the tag will not be inventoried at the center of the carrier beam, but more likely at some point somewhere between the 3 dB beam edges. This introduces angular error, with greater angular error for wide beams that emerge from low gain antennae. Inventory rounds are preferably swept across the tag from multiple angles, preferably using a high gain antenna in order to reduce the magnitude of location error.

Another cause for tags to not read is for a tag to be located at a null in the carrier field. A solution to this problem is to scan again from a different angle, as prescribed above for reducing location errors.

Much prior art was invented for case level tagging. Now the market needs a different solution for item level tagging. Those skilled in the art did not adequately address retail sales floor scanning needs. Retailers cannot afford to miss item tags; there may be 10 to 500 times more item level tags than case level tags in a retail store environment, each representing an item that must be sold.

Automated movement of two-wheeled robot 199, 200, 210, 230, 240, or 250 is based on two separately driven wheels 191a,b on either side of the robot. It changes its direction by differentially varying the relative rate of rotation of its wheels and does not require an additional steering motion.

Figure 31:
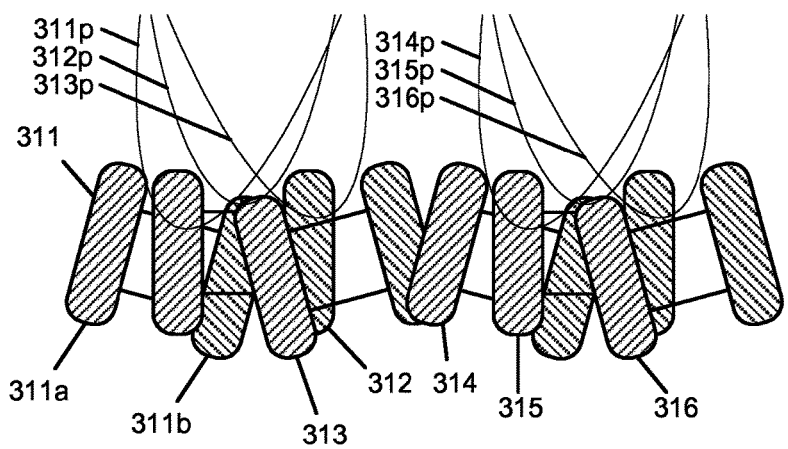
FIG. 31 is a diagram according to one embodiment of the present invention for positioning a two-wheeled robot to read a plurality of RFID tags.

Referring now to FIG. 31 is a series of robot wheel footprints 311-316, each footprint being indicative of a stationary position at which robot 199, 210, 230, 240, or 250 scans through various elevation angles, each scan step using an equal angular velocity profile in both wheels 191a,b such that the inertia of robot 199, 210, 230, 240, or 250 prevents movement from the indicated footprints through the duration of each elevation scan sequence. The equal angular velocity profiles preferably have relatively high rates of acceleration and deceleration to a peak velocity that is sustained for a short period of time as shown in FIG. 32.

Figure 32:
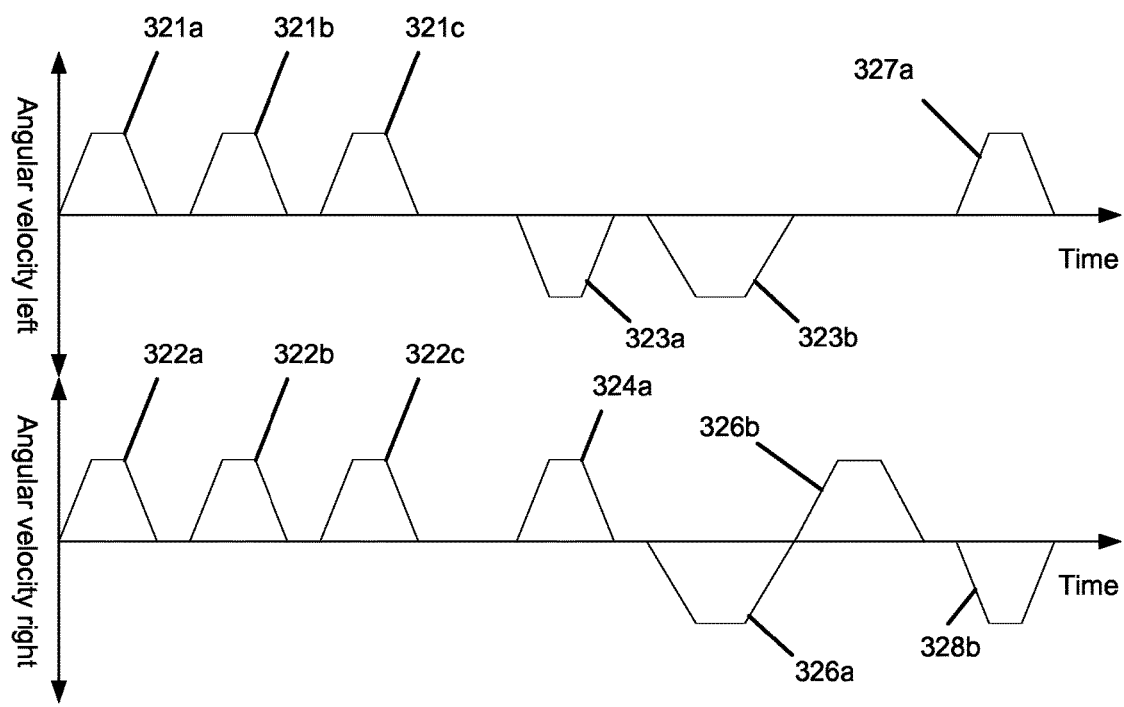
FIG. 32 is an angular velocity profile according to one embodiment of the present invention for positioning a two-wheeled robot to read a plurality of RFID tags.

Referring to FIG. 32 are a pair of exemplary velocity profiles for wheels 191a and 191b as they remain stationary through three elevation scans and then move from initial positions 311a and 311b as shown in FIG. 31. Antenna 211 focuses modulated and unmodulated RF carrier in beam pattern 311p on a plurality of PPR tags 13a-c, then motors for wheels 191a and 191b are both simultaneously energized with sufficient acceleration according to angular velocity profiles 321a and 322a so as to move antenna 211 to a new scanning elevation angle without moving the robot from wheel positions 311a and 311b. Each subsequent burst of high torque power to wheels 191a,b through angular velocity profiles 321b-c and 322b-c result in methodical angular elevation angle changes to antenna 211, managed by acceleration signals from micro-machined accelerometers such as MMA8453Q from Freescale and gyros such as the micro-machined three-axis angular rate sensor A3G4250D from ST Micro.

Synchronized opposing angular velocity pulses 323a and 324a result in a net zero torque resulting in no change in elevation of antenna 211 but does result in robot wheels 191a,b moving into positions 312 to create beam pattern 312p.

The synchronized wheel movements represented by low acceleration angular velocity profiles 323b, 326a, and 326b result in a new position 313 and beam pattern 313p. Additional velocity pulses 327a and 328b result in a rotation of the robot in a clockwise direction. Positions 314-316 and radio beam coverage patterns 314p-316p are the result of synchronized movements of the motors that drive wheels 191a,b at velocities and accelerations that when the inertia of the robot is taken into account, result in elevation angle changes or position changes.

Prior art, if at all, at best teaches the use of RSSI or varying power to determine the range of transponders. Wide interrogation beams are susceptible to more retro-reflections. The present invention additionally teaches the use of narrow radio beams directed at various scan angles into a plurality of transponders, a sub-population of which are preferably privacy-preserving transponders with recommissioning features. The scan angles are produced by torque control of wheels 191a and 191b.

Intermediate transponder location data preferably comprises transponder observations that are used for triangulation computations. Scan results are preferably reported in stages, the second stage comprising: SGTIN; observation point (i.e. location of robot x, y, z); viewing angle (elevation and azimuth); and RF power level (db). Each stage is stored and processed to produce a computation of each tag's location using a descriptor comprising: SGTIN; and computed X, Y, Z Cartesian location. The processing comprises the steps of:

1) Match all first stage SGTIN observations and consolidate the detection records
2) Match any second stage observations to the consolidated first stage records
3) Combine the first and second stage records by formulating the three dimensional vector for both stages and compute the Cartesian point of intersection.
4) Match the result to any previous result of computed X, Y, Z location in a third stage. If there are no matches, then store as final stage transponder location data.

FIG. 33 is a composite drawing of the preferred embodiments of the present invention shown in a top view of a typical retail store environment. Retail inventory is stored and displayed in racks and shelves 331a1-3,b1-3,c1 tables 333a-c, and rounders 332a-f all of which hold a plurality of transponders like transponders 13a-c. POS 11 is used for checkout and for PPR transponder privacy activation. Robots 120, 124, 150, 180, 199, 200, 210, 230, 240, 250, 336, and 337 are shown at work scanning inventory such as shirt 147b on rack 147a, with transponder 13a.

Aerial robot 124 is shown suspended over table 333b by cables, 122a-d and controlled by servo winches 121a-d. Winch 121c is shown using WiFi antenna 146b to receive commands from a controller to drive cable drum 146a to create proper tension and positioning for controlled aerial mobility at precise altitudes above the sales floor.

Aerial robots 120 and 150 are suspended from the ceiling. Track 121 guides the path of robot 120 for aerial mobility. Luminary readers 176 and 180 are shown over rounders 332a and 332e respectively.

Aerial robots UAV 336 and blimp 337 and two-wheeled robots 199, 200, 210, 230, 240, and 250, rotating rounder reader 148a, and consumer device 12 all preferably use overhead optical location reference strips 160a-c and location tags 148b, 334a1-3,b1-3,c1-2,d1-3 for navigation reference points.

While the invention has been particularly shown and described with reference to certain embodiments, it will be understood by those skilled in the art that various changes in form and detail may be made without departing from the spirit and scope of the invention.

I claim:

1. A two-wheeled robot for scanning RAID transponders comprising:
   a counterbalance located below the axles of the two wheels movable fore and aft relative to a body of the robot;
   a UHF antenna configured to form a directional beam pattern; the antenna mounted for rotation about an axis;
   a shaft encoder configured to measure the angle of rotation of the antenna;
   an RFID interrogator connected to the antenna; and a controller connected to the RFID interrogator,
   wherein the controller is configured to cause the RFID interrogator to transmit commands and listen for backscattered replies from RFID transponders as the antenna rotates and enable orientation in a wide range of angles relative to the tagged merchandize, giving the tags a view from many different angles while maintaining a focused beam of RF energy on the transponder population of interest.

2. The robot of claim 1, wherein the counterbalance comprises a battery.

3. The robot of claim 1, wherein the UHF antenna is a planar high gain antenna.

4. The system of claim 1, further comprising a beam sweep motor to rotate the antenna.

5. The robot of claim 1, wherein the controller is an iPad tablet.

6. The robot of claim 1, wherein the interrogator listens for backscattered replies containing serialized global trade item number (SGTIN-96).

7. The robot of claim 1, further comprising a camera for indoor navigation.

8. The robot of claim 1, further comprising ultrasonic sonar modules.

* * * * *